(12) United States Patent
Bhave et al.

(10) Patent No.: US 12,030,017 B2
(45) Date of Patent: Jul. 9, 2024

(54) FORWARD OSMOSIS COMPOSITE MEMBRANES FOR CONCENTRATION OF LITHIUM CONTAINING SOLUTIONS

(71) Applicants: UT-Battelle, LLC, Oak Ridge, TN (US); All American Lithium LLC, Brawley, CA (US)

(72) Inventors: Ramesh R. Bhave, Knoxville, TN (US); Vishwanath Deshmane, Painted Post, NY (US); Nicholas N. Linneen, Knoxville, TN (US); Stephen Harrison, Benicia, CA (US); Mariappan Paranthaman, Knoxville, TN (US); Bruce A. Moyer, Oak Ridge, TN (US); Syed Z. Islam, Oak Ridge, TN (US)

(73) Assignees: UT-Battelle, LLC, Oak Ridge, TN (US); TERRALITHIUM LLC, Houston, TX (US)

( * ) Notice: Subject to any disclaimer, the term of this patent is extended or adjusted under 35 U.S.C. 154(b) by 0 days.

(21) Appl. No.: 16/535,585

(22) Filed: Aug. 8, 2019

(65) Prior Publication Data
US 2020/0047124 A1 Feb. 13, 2020

Related U.S. Application Data

(60) Provisional application No. 62/716,429, filed on Aug. 9, 2018.

(51) Int. Cl.
| | | |
|---|---|---|
| B01D 61/00 | (2006.01) | |
| B01D 69/04 | (2006.01) | |
| B01D 69/12 | (2006.01) | |
| B01D 71/34 | (2006.01) | |
| B01D 71/36 | (2006.01) | |
| B01D 71/52 | (2006.01) | |
| B01D 71/68 | (2006.01) | |

(52) U.S. Cl.
CPC ....... B01D 61/005 (2013.01); B01D 61/0022 (2022.08); B01D 69/04 (2013.01); B01D 69/1216 (2022.08); B01D 71/34 (2013.01); B01D 71/36 (2013.01); B01D 71/5222 (2022.08); B01D 71/68 (2013.01); *B01D 2311/103* (2013.01); *B01D 2325/028* (2013.01); *B01D 2325/20* (2013.01)

(58) Field of Classification Search
CPC ....... C02F 1/445; B01D 61/002; B01D 71/34; B01D 71/32; B01D 71/36; C08F 14/22
See application file for complete search history.

(56) References Cited

U.S. PATENT DOCUMENTS

| | | | |
|---|---|---|---|
| 6,734,386 B1 | 5/2004 | Lauterbach et al. | |
| 8,425,814 B2 | 4/2013 | Mezhirov et al. | |
| 8,920,654 B2* | 12/2014 | Revanur | B01D 69/125 |
| | | | 210/644 |
| 10,266,915 B2 | 4/2019 | Paranthaman et al. | |
| 2012/0067819 A1* | 3/2012 | McGinnis | B01D 61/366 |
| | | | 210/260 |
| 2012/0080378 A1* | 4/2012 | Revanur | B01D 69/06 |
| | | | 427/244 |
| 2015/0060364 A1* | 3/2015 | McCutcheon | B01D 67/0006 |
| | | | 427/244 |
| 2018/0147532 A1* | 5/2018 | Switzer | C01D 15/04 |
| 2019/0275473 A1 | 9/2019 | Bhave et al. | |

FOREIGN PATENT DOCUMENTS

| | | | | |
|---|---|---|---|---|
| WO | 2012047282 A2 | 4/2012 | | |
| WO | 2015093876 A1 | 6/2015 | | |
| WO | WO-2015093876 A1 * | 6/2015 | ............ | B01D 69/12 |
| WO | WO-2017083473 A1 * | 5/2017 | ............ | B01D 53/22 |

OTHER PUBLICATIONS

Yang et al. "Effect of temperature on the crystalline phase and dielectric and ferroelectric properties of poly(vinylidene fluoride) film" Journal of Intelligent, Material Systems, and Structures, 2014, vol. 25(7), p. 858-864 (Year: 2014).*
Flanagan, et al., "Novel charged and hydrophilized polybenzimidazole (PBI) membranes for forward osmosis", Journal of Membrane Science, 434:85-92, Feb. 8, 2013.
Li, et al., "Lithium Recovery from Aqueous Resources and Batteries: A Brief Review", Johnson Matthey Technology Review, 62(2):161-176, (2018).
International Search Report dated Jan. 3, 2020 issued in PCT/US19/45683.

* cited by examiner

*Primary Examiner* — Ryan B Huang
(74) *Attorney, Agent, or Firm* — Scully, Scott, Murphy & Presser, P.C.

(57) ABSTRACT

A method of concentrating a lithium-containing aqueous solution, the method comprising: (i) providing a water-permeable structure having an inner surface and outer surface, wherein at least said outer surface is coated with a water-permeable hydrophilic polymer having a thermal stability of at least 100° C.; and (ii) flowing a lithium-containing aqueous feed solution having an initial concentration of lithium over said inner surface while said outer surface is in contact with an aqueous draw solution containing a higher overall ion concentration than said lithium-containing aqueous feed solution, to result in forward osmosis of water from said lithium-containing aqueous feed solution to said aqueous draw solution, and wherein said forward osmosis results in a lithium-containing aqueous product solution having an increased concentration of lithium relative to the initial concentration of lithium in the lithium-containing aqueous feed solution.

21 Claims, 14 Drawing Sheets

Tubular Membrane Operating in a Cross-Flow Configuration

FORWARD OSMOSIS COMPOSITE MEMBRANES FOR CONCENTRATION OF LITHIUM CONTAINING SOLUTIONS

CROSS-REFERENCE TO RELATED APPLICATIONS

The present application claims benefit of U.S. Provisional Application No. 62/716,429 filed Aug. 9, 2018, all of the contents of which are incorporated herein by reference.

STATEMENT REGARDING FEDERALLY SPONSORED RESEARCH

This invention was made with government support under Prime Contract No. DE-AC05-00OR22725 awarded by the U.S. Department of Energy. The government has certain rights in the invention.

FIELD OF THE INVENTION

The present invention generally relates to methods and compositions for extracting and concentrating lithium salts from aqueous solutions. The present invention further relates to the use of lithium sorbent materials incorporated into lithium extraction devices for extracting lithium from lithium-containing solutions.

BACKGROUND OF THE INVENTION

In recent years, the global demand for lithium chemicals has attracted much attention due to the accelerated expansion of lithium-ion battery (LIB) industries in portable electronics and hybrid/electric vehicles. In addition to LIBs, lithium is also a major raw material for the glass and ceramic industries. The multitude of lithium applications is enhancing its demand with an annual growth rate of 8.9% through 2019 to 49,350 metric tons (Ziemann, S. et al., *Conservation and Recycling*, 2012. 63: p. 26-34). Thus, a substantial increase in lithium production capacity is a key priority to meet the global growing demand and prevent the supply risk of lithium. While the primary sources of lithium are minerals, such as spodumene and pegmatites, lithium is also available in continental and geothermal brines, clays, and seawater in various parts of the world (Grosjean, C. et al., *Renewable and Sustainable Energy Reviews*, 2012. 16(3): p. 1735-1744). It has been reported that the production cost of lithium from salt brine is less than half of the cost from ores or spodumene, and lithium production from brines is more environmentally friendly (Grosjean, Ibid.).

Among various lithium-containing brines, geothermal brines are the most promising resources for industrial scale lithium extraction because they contain higher lithium concentration compared to other sources (Meshram, P. et al., *Hydrometallurgy*, 2014. 150: p. 192-208). Moreover, geothermal brines are also used to produce electricity and are a source of other minerals, such as alkali and alkaline earth metals. The current state of the art for recovery of lithium from geothermal brines is a sorption-based system which involves a three-step process, including extraction, wash, and strip under repeated cycling conditions (L. Li et al., *Johnson Matthey Technology Review*, 2018. 62(2): p. 161-176). Notably, the overall recovery of lithium is significantly low, and the eluant solution typically contains significant levels of impurities, such as sodium, potassium, calcium, and magnesium, in addition to chloride ions. In certain eluant solutions, the feed solution may contain sulfate or phosphate ions instead of chloride ions. The low concentration of lithium in brine in the presence of high salt concentrations makes it challenging to obtain a high-purity product. Thus, the recovered LiCl solution generally requires further concentration to about 7-10 wt. % prior to conversion to $Li_2CO_3$ or LiOH, which is one of the products widely used in LIBs (U.S. Pat. Nos. 9,034,295 and 9,074,265). Currently, lithium is produced from brine mostly through the solar evaporation process, followed by the removal of impurities through precipitation and crystallization. However, this method is time consuming (e.g., usually 18-24 months), generally requires large land areas, and is generally energy intensive and costly. The solar evaporation process is also a highly climate and geographically dependent process. Furthermore, due to the presence of other salts, evaporation further increases the concentration of the undesirable impurities in the product, whereas lithium-ion batteries typically require a lithium purity of at least 99.5 wt. %.

Membrane-based selective lithium concentration processes have also been investigated. Some of the membrane-based lithium extraction processes studied include nanofiltration, electrolysis, electrodialysis, solvent extraction, membrane assisted solvent extraction, adsorbents or mixed matrix membranes. For example, research has been conducted on a positively charged composite nanofiltration membrane for $LiCl/MgCl_2$ separation (Li, W. et al., *Separation and Purification Technology*, 2017. 186: p. 233-242). Although significant progress has been made, the membrane-based methods have generally been limited to extraction, recovery, or separation of lithium from other cations. However, a high purity lithium, as required for LIB s, has generally remained elusive by these methods. Moreover, the research conducted thus far has not addressed the remaining problem of increasing the concentration of lithium-containing solutions recovered from geothermal brines or other source in a manner that is significantly more energy efficient, time efficient, and cost-effective than currently known processes and that provides a substantially pure lithium-containing solution.

SUMMARY OF THE INVENTION

The present disclosure is directed to a membrane-based method of concentrating a lithium-containing aqueous solution in a substantially more energy efficient, time efficient, and cost-effective manner than conventional processes of the art. In addition to these advantages, the process described herein provides lithium-containing solutions that are substantially pure in their lithium content (e.g., at least or above 99 wt. % or 99.5 wt. %), which makes the resulting lithium-containing solutions of acceptable purity for use in a number of applications in which lithium is used, such as lithium-ion batteries. The process described herein provides a method that minimizes contamination of LiCl feed solution with other impurities while increasing the LiCl concentration. As further discussed below, the process relies on forward osmosis generated by the osmotic pressure difference between a relatively dilute lithium-containing feed solution and a relatively concentrated draw solution. That is, a difference in osmotic pressure between the dilute solution (such as a LiCl solution) and a highly concentrated salt solution (such as naturally occurring brine) is used as a driving force for water transfer from the dilute solution into the concentrated solution across a semi-permeable membrane.

More specifically, the method includes: (i) providing a water-permeable structure having an inner surface and outer surface, wherein at least the outer surface is coated with a water-permeable hydrophilic polymer having a thermal stability of at least 100° C.; and (ii) flowing a lithium-containing aqueous solution having an initial concentration of lithium over the inner surface while the outer surface is in contact with an aqueous draw solution containing a higher overall ion concentration than the lithium-containing aqueous solution, to result in forward osmosis of water from the lithium-containing aqueous solution to the aqueous draw solution, and wherein the forward osmosis results in a lithium-containing aqueous solution having an increased concentration of lithium relative to the initial lithium concentration. In some embodiments, the method includes flowing a lithium-containing aqueous solution having an initial concentration of lithium through a water-permeable structure having an inner surface and outer surface, wherein at least the outer surface is coated with a water-permeable hydrophilic polymer having a thermal stability of at least 100° C., wherein the inner surface is in contact with the lithium-containing aqueous solution and the outer surface is in contact with an aqueous draw solution containing a higher overall ion concentration than the lithium-containing aqueous solution to result in forward osmosis of water from the lithium-containing aqueous solution to the aqueous draw solution containing a higher overall ion concentration. In the process, the forward osmosis results in a lithium-containing aqueous solution having an increased concentration of lithium relative to the initial lithium concentration. The water-permeable hydrophilic polymer may be, for example, a fluoropolymer, polyether ether ketone (PEEK), polysulfone (PSU), poly(ethersulfone) (PES), polyetherimide (PEI), poly(phenylene sulfide) (PPS), or polybenzimidazole (PBI), or mixture thereof, composite thereof, or copolymer thereof. The forward osmosis process described herein generally does not result in transfer of lithium from the lithium-containing aqueous solution into the draw solution and also does not result in transfer of ionic species from the draw solution into the lithium-containing aqueous solution, all of which results in a solution of high purity lithium and with minimal loss.

BRIEF DESCRIPTION OF THE DRAWINGS

FIG. 10A shows results for the feed solution cation concentration. FIG. 10B shows results for the feed solution salt concentration. FIG. 10C shows results for the draw solution cation concentration.

FIG. 11A shows results for the feed solution cation concentration. FIG. 11B shows results for the feed solution salt concentration. FIG. 11C shows results for the draw solution cation concentration.

FIG. 12A shows results for the feed solution cation concentration. FIG. 12B shows results for the feed solution salt concentration. FIG. 12C shows results for the draw solution cation concentration.

FIG. 13A shows results for the feed solution cation concentration. FIG. 13B shows results for the feed solution salt concentration. FIG. 13C shows results for the draw solution cation concentration.

FIG. 14A shows results for the feed solution cation concentration. FIG. 14B shows results for the feed solution salt concentration. FIG. 14C shows results for the draw solution cation concentration.

DETAILED DESCRIPTION OF THE INVENTION

Figure 1:
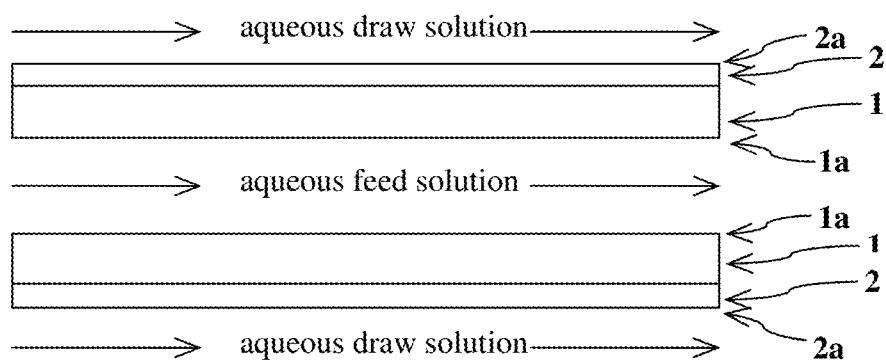
FIG. 1 is a general schematic of an exemplary process for concentrating an aqueous lithium-containing feed solution by using one or more planar water-permeable structures (1) having an inner surface (1*a*) and outer surface (2*a*), with at least the outer surface coated with a water-permeable hydrophilic polymer (2).

In the method described herein, a lithium-containing aqueous feed solution having an initial concentration of lithium (i.e., "feed solution") is concentrated by forward osmosis of water from the feed solution across a water-permeable structure into an overall much more concentrated solution (i.e., "draw solution"). The water-permeable structure has an inner surface and outer surface, with at least the outer surface coated with a water-permeable hydrophilic polymer. The water-permeable structure can have any shape that permits the flow and contact of the feed solution with the inner surface of the water-permeable structure and also permits the flow and contact of the draw solution with the outer surface of the water-permeable structure, while maintaining separation of the feed and draw solutions. The water-permeable structure may be, for example, planar or tubular, wherein the term "tubular" also includes the possibility of one or more (e.g., bundle of) hollow fibers.

The feed solution typically contains lithium (i.e., lithium ion or lithium salt) in a concentration of up to (i.e., no more than) or less than 20 g/L, 15 g/L, 10 g/L, 5 g/L, 2 g/L, or 1 g/L. The feed solution also typically contains an overall ionic concentration of no more than 150 g/L, 120 g/L, 100 g/L, 50 g/L, 40 g/L, 30 g/L, 20 g/L, 10 g/L, 5 g/L, 2 g/L, or 1 g/L depending on the draw solution composition and osmotic pressure. The phrase "overall ionic concentration" refers to the total concentration of all ions present in the solution (e.g., one or more of lithium, sodium, potassium, calcium, magnesium, chloride, bromide, fluoride, carbonate, and/or sulfate). The feed solution can be any lithium-containing aqueous solution having any of the above relatively low lithium concentrations coupled with a relatively low overall ionic concentration. The feed solution may result from, for example, any of the lithium recovery methods known in the art, such as sorption-based methods, solar evaporation, or membrane-based methods (e.g., nanofiltration, electrolysis, electrodialysis, membrane solvent extraction, adsorbents, or mixed matrix membranes). In some embodiments, the feed solution is provided by a membrane-based selective lithium extraction process, which may be any such process known in the art. The feed solution contains lithium in a predominant amount relative to other metal species. Notably, the high selectivity of the membrane-based selective lithium extraction process generally results in the lithium concentration of the extracted lithium solution (i.e., the feed solution for purposes of the present invention) being approximately equivalent to its overall ionic concentration.

The draw solution contains a higher overall ion concentration than the feed solution. The draw solution may contain any ionic species or salts thereof, such as one or more of those exemplified above, and may or may not also contain lithium. Generally, the aqueous draw solution has an overall ion concentration of at least or above 100, 150, 175, 200, 250, 300, 350, or 400 g/L, or a concentration bounded by any two of the foregoing values. The draw solution provides a substantial osmotic pressure, e.g., an osmotic pressure of more than 200 bar. In some embodiments, the aqueous draw solution is a naturally occurring geothermal brine solution. In other embodiments, the aqueous draw solution is a spent geothermal brine solution that is depleted in lithium. The aqueous draw solution may alternatively be an ambient brine or clay mineral.

The water-permeable hydrophilic polymer (WPHP) is water-permeable by virtue of its hydrophilic property and/or porosity. In the event the WPHP is porous, it may include micropores (i.e., generally less than 1 nm or 2 nm in diameter) and/or mesopores (i.e., generally 2-50, 2-20, or 2-10 nm diameter). The WPHP generally excludes macropores (greater than 50 nm diameter). Generally, the coating of the WPHP has a thickness of no more than or less than 10 microns, 5 microns, or 1 micron. The coating of the WPHP is present at least on the outer surface of the water-permeable structure, wherein the outer surface is the surface that makes contact with the draw solution and the inner surface is the surface that makes contact with the feed solution (to be concentrated by forward osmosis). In a first embodiment, the coating of the WPHP is present on only the outer surface. In a second embodiment, the coating of the WPHP is present on both the outer surface and inner surface. In the event the WPHP is present on both the outer and inner surfaces, the two coatings may be independently selected in composition, thickness, and porosity. In some embodiments, the two coatings are the same in composition, thickness, and/or porosity, while in other embodiments, the two coatings are different in composition, thickness, and/or porosity. The WPHP also has a thermal stability of at least 100° C. In different embodiments, the WPHP has a thermal stability of at least or above 100° C., 110° C., 120° C., 130° C., 140° C., 150° C., 160° C., 170° C., 180° C., 190° C., 200° C., 210° C., 220° C., 230° C., 240° C., or 250° C.

The WPHP is hydrophilic either by virtue of its inherent unmodified composition or by subsequent modification, such as by surface functionalization (i.e., surface hydrophilization) or by copolymerization with hydrophilic units or segments. Some examples of WPHPs include fluoropolymers, polyether ether ketone (PEEK), polysulfone (PSU), poly(ethersulfone) (PES), polyetherimide (PEI), poly(phenylene sulfide) (PPS), and polybenzimidazole (PBI). Some examples of fluoropolymers include polyvinylidene fluoride (PVDF), polytetrafluoroethylene (PTFE), perfluorocycloalkenes (PFCAs), and perfluoroalkoxy alkanes (PFAs). Hydrophilic polymeric membranes and methods for producing them are described in, for example, R. Singh, Membrane Technology and Engineering for Water Purification (2$^{nd}$ Edition), Elsevier Ltd., Chapter 1, pp. 1-80, © 2015, ISBN 978-0-444-63362-0; and M. L. Steen et al., *Journal of Membrane Science*, 204(1-2), pp. 341-357, 2002, the contents of which are incorporated herein by reference in their entirety. In particular embodiments, the WPHP is a hydrophilized version of polyvinylidene fluoride (PVDF), as commercially available and as described in, for example, N. A. Hashim et al., *Journal of Membrane Science*, 345 (1-2), 134-141, December 2009; S. Liang et al., *ACS Appl. Mater. Interfaces*, 5(14), 6694-6703, 2013; A. Qin et al., *ACS Appl. Mater. Interfaces*, 7(16), 8427-8436, 2015; M. Tao et al., *J. Mater. Chem.*, 22, 9131-9137, 2012; L. G. Wang et al., *Advanced Materials Research*, 306-307, 1563-1568, 2011; U.S. Pat. Nos. 6,734,386; 4,810,384; and 4,248,913, all of the contents of which are herein incorporated by reference in their entirety. A method for preparing hydrophilic polyethersulfone membranes is described in, for example, U.S. Pat. No. 8,425,814, the contents of which are herein incorporated by reference in their entirety. Methods for preparing hydrophilized PEEK are described in, for example, K. H. Kim et al., *J. Appl. Polym. Sci.*, 135, 46042, 2018 and S. Kim et al., Langmuir, 20(1), 157-163, 2004, the contents of which are herein incorporated by reference in their entirety. A method for preparing a hydrophilized polysulfone membrane is described in M. K. Sinha et al., *Journal of Membrane Science*, 437, 7-16, June 2013, the contents of which are herein incorporated by reference in their entirety. A method for preparing a hydrophilized polyetherimide composite membrane is described in, for example, M. Qtaishat et al., *Journal of Membrane Science*, 327(1-2), 264-273, February 2009, the contents of which are herein incorporated by reference in their entirety. A method for preparing a hydrophilized polyphenylene sulfide membrane is described in, for example, C. Wang et al., *Macromol. Res.,* 26(9), 800-807, 2018, the contents of which are herein incorporated by reference in their entirety. A method for preparing hydrophilized polybenzimidazole membranes is described in, for example, M. F. Flanagan et al., *Journal of Membrane Science,* 434, 85-92, 2013, the contents of which are herein incorporated by reference in their entirety.

The water-permeable structure ("WPS") functions as a support on which the water-permeable hydrophilic polymer ("WPHP") is coated. The WPS is water-permeable by virtue of a water transporting ability of its composition or by virtue of porosity. The porosity may be microporosity (pores of less than 1 or 2 nm) or mesoporosity (pores of 2-50 nm, or 2-20 nm, or 2-10 nm), or any range of pore sizes spanning microporous and/or mesoporous (e.g., 1-50 nm, 5-50 nm, 10-50 nm, 15-50 nm, or 20-50 nm). Any of the foregoing sizes of micropores or mesopores or ranges thereof may also be excluded. Generally, macropores (pores greater than 50 or 100 nm) are excluded, since their presence would likely result in exchange of feed and draw solutions. The forward osmosis process described herein preferably does not result in transfer of lithium from the lithium-containing aqueous feed solution into the draw solution and does not result in transfer of ionic species from the draw solution into the lithium-containing aqueous feed solution. Particularly as the forward osmosis process may be conducted at elevated temperatures, the WPS should be constructed of a material (e.g., inorganic or organic, such as ceramic or polymer) having a thermal stability of at least 100° C., 120° C., 150° C., 180° C., 200° C., 220° C., or 250° C. In some embodiments, the support is acid resistant.

In one set of embodiments, the WPS has an inorganic composition. The term "inorganic," as used herein, refers to those compositions not containing carbon or wherein carbon is present but in its elemental state or not covalently bonded to hydrogen atoms. Typically, the inorganic composition includes at least one metal, wherein the term "metal," as used herein, includes traditionally defined metals as well as metalloids (those elements having both metallic and non-metallic properties and which overlap with the main group elements). In a first exemplary embodiment, the inorganic composition is or includes a metal oxide composition, such as silica, gibbsite, bayerite, alumina (e.g., α-, β-, or γ-alumina, θ-$Al_2O_3$, χ—$Al_2O_3$, κ-$Al_2O_3$, ε—$Al_2O_3$, δ-$Al_2O_3$, λ-$Al_2O_3$, activated alumina, AlO(OH), pseudoboehmite, or a combination thereof), or an aluminosilicate, such as a zeolite, e.g., MFI-type, MEL-type, MTW-type, MCM-type, BEA-type, faujasite, or ZSM-type zeolites. The metal oxide composition may alternatively be or include, for example, zirconium oxide, yttrium oxide, titanium oxide, cerium oxide, chromium oxide, copper oxide, nickel oxide, or hafnium oxide, or a combination thereof. In a second exemplary embodiment, the inorganic composition is or includes a metal carbide composition, such as silicon carbide, iron carbide (e.g., steel), tungsten carbide, titanium carbide, molybdenum carbide, or boron carbide, or combination thereof. In a third exemplary embodiment, the inorganic composition is or includes a metal nitride composition, such as boron nitride, silicon nitride, silicon oxynitride, silicon carbide nitride, aluminum nitride, tantalum nitride, or zirconium nitride, or combination thereof. In a fourth exemplary embodiment, the inorganic composition is or includes a metal boride composition, such as aluminum boride, titanium boride, cobalt boride, tantalum boride, or magnesium boride, or combination thereof. In some embodiments, the inorganic composition is a ceramic composition, which may be an oxide, carbide, nitride, or boride material, such as any of the compositions exemplified above. In a fifth exemplary embodiment, the inorganic composition is or includes an element in its zerovalent (elemental) state, such as a transition metal (e.g., iron, cobalt, nickel, or zinc) or a main group element (e.g., carbon). In the case of the support being carbon, the carbon support may be a molecular sieve carbon material or oxide-modified version thereof, as well known in the art (e.g., H. C. Foley, *ACS Symposium Series,* vol. 368, Chapter 21, pp. 335-360, 1988, the contents of which are herein incorporated by reference in their entirety). Mixtures or composites of any of the above inorganic compositions may also be used. In some embodiments, any one or more classes or specific types of inorganic compositions described above may be excluded.

In another set of embodiments, the WPS has a polymeric composition. The polymer may be, for example, a vinyl-addition polymer (e.g., polyvinylchloride, polyethylene, polypropylene, or a fluoropolymer, such as PVDF or PTFE), polyimide, polyether ether ketone (PEEK), polybenzimidazole, poly(ethersulfone) (PES), polyetherimide (PEI), poly (phenylene sulfide) (PPS), ionomer (e.g., sulfonated tetrafluoroethylene, such as Nafion®), polysiloxane (e.g., a silicone rubber or foam), polyurethane, polycarbonate, polyethyleneimine, polyester (e.g., polyethylene terephthalate), or polyamide (e.g., a nylon). The polymer may alternatively be a copolymer that includes one or more of any of the foregoing polymers. The polymer may alternatively be a mixture of polymers that includes at least one of the foregoing polymers. The polymer may alternatively be a composite that includes at least one of the foregoing polymers, wherein the composite includes separate regions (e.g., layers) of polymers of different compositions. In particular embodiments, the WPS is a fluoropolymer, such as any of the fluoropolymers described above for the WPHP, e.g., PVDF, PTFE, PFCA, or PFA.

In the method, the lithium-containing feed solution makes contact with and is flowed over the inner surface of the water-permeable structure. The inner surface may or may not be coated with the water-permeable hydrophilic polymer. At the same time, the aqueous draw solution makes contact with and is flowed over the outer surface of the water-permeable structure, wherein the outer surface is coated with the water-permeable hydrophilic polymer. As discussed above, by virtue of the high overall ion concentration of the draw solution, the draw solution provides a substantial osmotic pressure, e.g., an osmotic pressure of more than 200 bar. This osmotic pressure provides the driving force to result in forward osmosis of water from the feed solution to the draw solution. As a result of the forward osmosis, the feed solution becomes substantially more concentrated in lithium over time (relative to the initial concentration of lithium in the feed solution). Generally, the method excludes a reverse osmosis process. The concentrated lithium solution, as produced by forward osmosis, is herein referred to as the lithium-containing aqueous product solution, or "product solution". For example, whereas the feed solution may contain an initial concentration of lithium of up to 20 g/L, the product solution may have a concentration of lithium of at least or above 30, 40, 50, 60, 70, 80, 90, or 100 g/L. In some embodiments, the concentration of lithium in the product solution is at least 50%, 75%, 100%, 150%, or 200% greater than the feed solution. Moreover, the method described herein advantageously results in a substantially pure aqueous solution of the lithium salt, e.g., lithium in at least or greater than 90 wt. %, 95 wt. %, 98 wt. %, or 99 wt. % purity. The method described herein may also achieve any of the foregoing increases in lithium concentration within a significantly shorter time period than conventional lithium concentrating processes. The method described herein may achieve such increased lithium concentrations within, no more than, or less than, for example, 30 days (720 hours), 20 days (480 hours), 10 days (240 hours), 5 days (120 hours), 2 days (48 hours), or 1 day (24 hours), or within a time period bounded by any two of the foregoing values.

The method may be conducted at room temperature (typically, about 20-25° C.) or an elevated temperature of precisely, about, at least, or above, for example, 30, 40, 50, 60, 70, 80, 90, or 100° C., or a temperature within a range bounded by any two of the foregoing values, e.g., 25-100° C. When the method is conducted at room temperature, all components of the process (e.g., the feed and draw solutions and water-permeable structure) are at room temperature. When the method is conducted at an elevated temperature, at least the draw solution is at the elevated temperature. In some embodiments, only the draw solution is at an elevated temperature, while in other embodiments, all components of the process (e.g., the feed and draw solutions and water-permeable structure) are at an elevated temperature.

Figure 2:
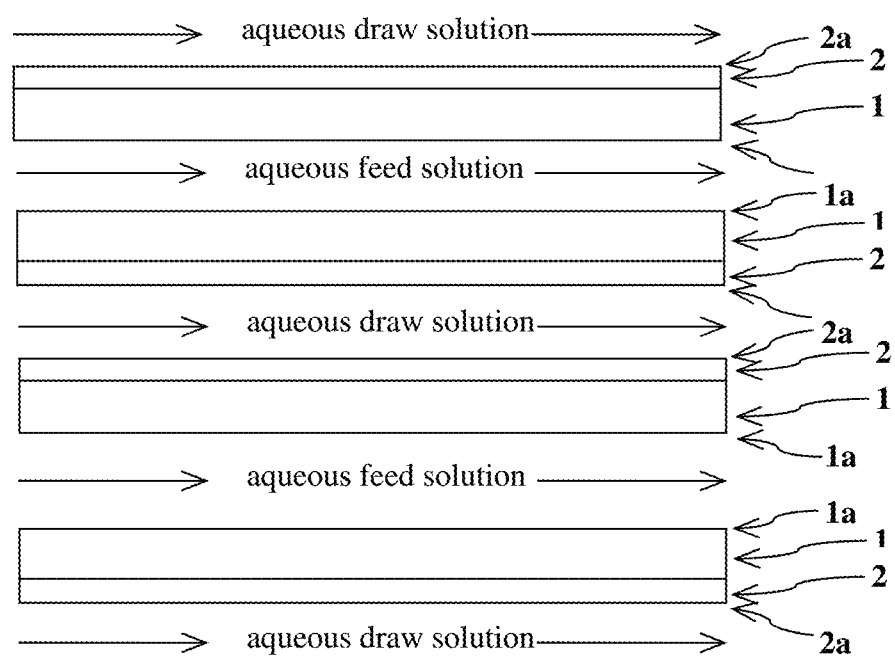
FIG. 2 is a general schematic of an exemplary process for concentrating an aqueous lithium-containing feed solution by using more than two planar structures to form a stacked structure in which flows of the feed and draw solutions alternate between planar structures.

In a first particular embodiment, the water-permeable structure (i.e., the support on which the water-permeable hydrophilic polymer is coated) has a planar shape. The water-permeable structure is also referred to herein as "WPS". Generally, when the WPS has a planar structure, the WPS contains at least two planar support structures with inner surfaces facing each other to form an inner conduit for the flow of aqueous feed solution. In the method, at least one of the opposing outer surfaces is in contact with the aqueous draw solution. A general exemplified schematic of the process using a planar structure is provided in FIG. 1. In FIG. 1, the component denoted as "1" is the WPS while the component denoted as "2" is the coating of water-permeable hydrophilic polymer (WPHP) on the WPS. FIG. 1 depicts the coating of the WPHP ("2") on the outer surface ("2a") of the planar WPS, with the aqueous draw solution flowing parallel and in contact with the outer surface ("2a"). FIG. 1 also depicts both inner surfaces (i.e., "1a," corresponding to uncoated sides of the WPS) facing each other, with the aqueous feed solution flowing parallel and in contact with the inner surface ("1a"). Although the inner surfaces ("1a") are depicted in FIG. 1 as being uncoated with the WPHP, in some embodiments, one or both of the inner surfaces ("1a") may be coated with the WPHP. Moreover, although two planar structures are depicted sandwiching an aqueous feed solution in FIG. 1, the process may be practiced with only a single planar structure. Alternatively, the process may employ more than two planar structures to form a stacked structure in which flows of the feed and draw solutions alternate between planar structures, such as depicted in FIG. 2. Moreover, although the feed and draw solutions are depicted in FIGS. 1 and 2 as flowing in the co-current (same) direction, the feed and draw solutions may, in some embodiments, be made to flow in counter-current (opposite or different) directions.

Figure 3:
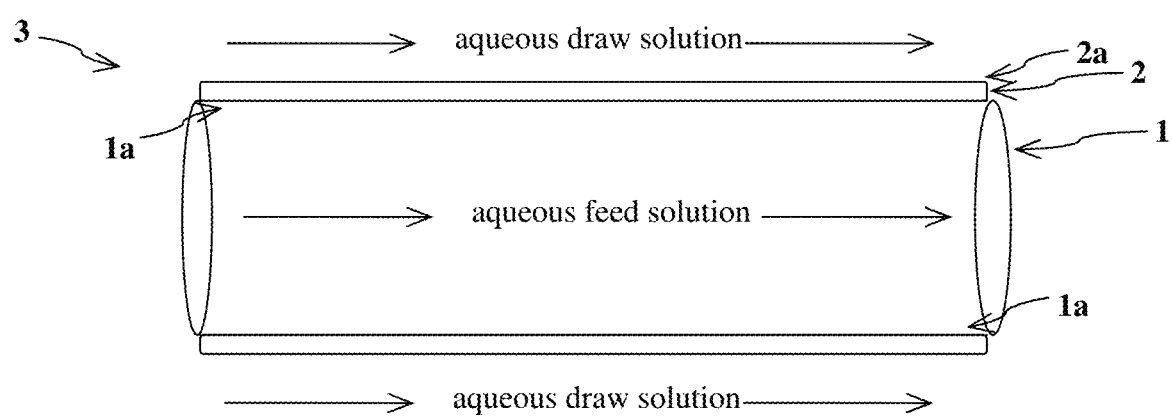
FIG. 3 is a general schematic of an exemplary process for concentrating an aqueous lithium-containing feed solution by using a tubular water-permeable structure (1), such as hollow fiber, having an inner surface (1*a*) and outer surface (2*a*), with at least the outer surface coated with a water-permeable hydrophilic polymer (2).

In a second particular embodiment, the water-permeable structure has a tubular shape. A general exemplified schematic of the process using a tubular shape is provided in FIG. 3, wherein the entire tubular structure is denoted as component "3". As above, in FIG. 3, the component denoted as "1" is the WPS while the component denoted as "2" is the coating of water-permeable hydrophilic polymer (WPHP) on the WPS. FIG. 3 depicts the coating of the WPHP ("2") on the outer surface ("2a") of the tubular WPS, with the aqueous draw solution flowing parallel and in contact with the outer surface ("2a"). Although the inner surface ("1a") is depicted in FIG. 3 as being uncoated with the WPHP, in some embodiments, a portion or the entire inner surface ("1a") may be coated with the WPHP. Moreover, although the feed and draw solutions are depicted in FIG. 3 as flowing in the same direction, the feed and draw solutions may, in some embodiments, be made to flow in opposite directions. Although the tubular structure in FIG. 3 is depicted as circular, other tubular (hollow) shapes are considered herein, such as square or higher polygonal.

Figure 4:
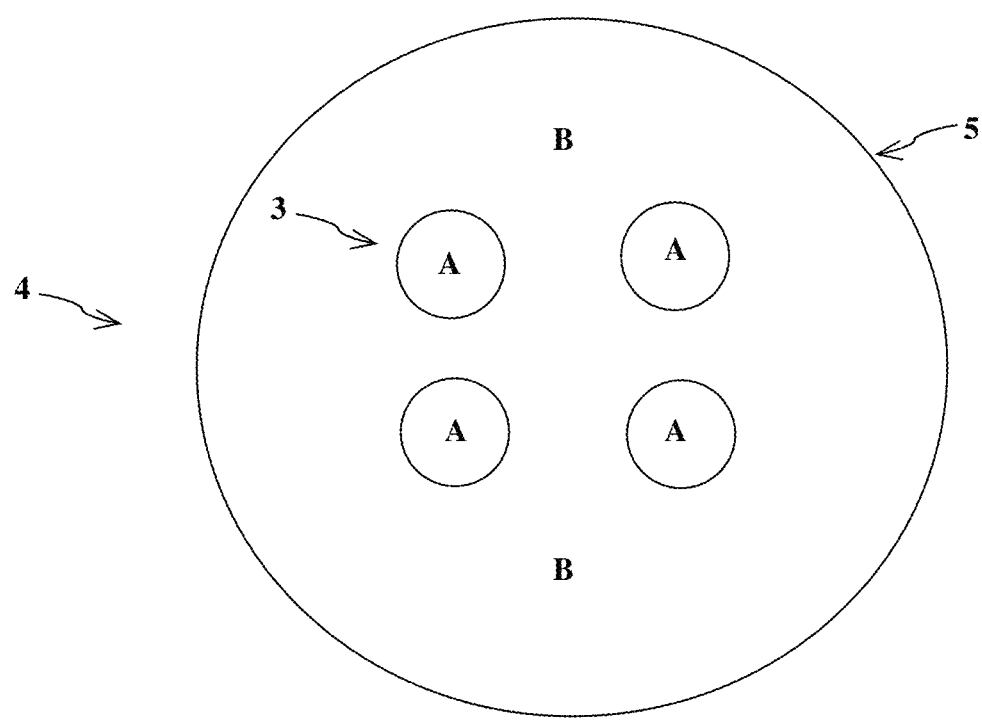
FIG. 4 is a cross-sectional view (4) of a multi-tubular structure for concentrating an aqueous lithium-containing feed solution. The multi-tubular structure ("4") includes an outer housing ("5") of any desired shape (although depicted in FIG. 4 as circular). Within the outer housing are tubular structures corresponding to structure "3" depicted in FIG. 3. The component "A" denotes the aqueous feed solution, which flows through the structure "3", thereby making contact with the inner (uncoated or coated) surface of structure "3". The component "B" denotes the aqueous draw solution, which surrounds and flows past the structures "3", thereby making contact with the outer coated surface of structure "3".

The process may also employ more than one tubular structure to form a multi-tubular structure, a cross-section of which is as depicted in FIG. 4. In FIG. 4, a cross-section of an exemplary multi-tubular structure is denoted as "4". The multi-tubular structure ("4") includes an outer housing ("5") of any desired shape (although depicted in FIG. 4 as circular). Within the outer housing are tubular structures corresponding to structure "3" depicted in FIG. 3. The component "A" denotes the aqueous feed solution, which flows through the structure "3", thereby making contact with the inner (uncoated or coated) surface of structure "3". The component "B" denotes the aqueous draw solution, which surrounds and flows past the structures "3", thereby making contact with the outer coated surface of structure "3". Notably, although four inner tubular structures corresponding to structure "3" are shown in FIG. 4, the multi-tubular structure depicted in FIG. 4 is meant to include any number of inner tubular structures ("3"), such as two, three, four, five, six, or a much greater multiplicity of tubular structures ("3") through which the aqueous feed solution flows. The inner tubular structures ("3") may have any suitable diameter for flowing the aqueous feed solution, e.g., 100, 500, 1000, 5000, or 10,000 microns, or 0.1, 1, 2, 5, or 10 mm (1 cm), or a diameter within a range bounded by any two of these values, such as 100 microns to 1 cm.

In particular embodiments, the lithium-containing aqueous feed solution is the product of a lithium selective extraction process, i.e., the lithium-containing solution resulting from a lithium selective extraction process becomes the aqueous feed solution for the method described herein in which the feed solution is concentrated by forward osmosis, as described above. In further particular embodiments, the lithium extraction method involves extracting a lithium salt from an aqueous source solution by extracting the lithium salt into a lithium-selective sorbent material and releasing and recovering the lithium salt from the lithium-selective sorbent material. The extraction process may be practiced without applying a pressure gradient on the lithium-selective sorbent material. The aqueous source solution can be any aqueous solution containing a lithium salt, which may be either in the absence or presence of other metal salt species (e.g., sodium, potassium, magnesium, and/or calcium salt species). The aqueous source solution is typically a natural brine, such as a continental, geothermal, oilfield geothermal, Smackover, or salar brine solution. However, the aqueous source solution may also be anthropogenic, such as a high ionic strength solution emanating from a lithium waste recovery process, such as may occur in a lithium battery recycling process. The lithium can be present in any concentration in the aqueous source solution, typically in an amount of at least 0.1M concentration. In different embodiments, the lithium is present in the aqueous source solution in a molar concentration of at least or above 0.1, 0.2, 0.5, 1, 2, 3, 4, or 5M concentration, or in a concentration within a range bounded by any two of the foregoing values.

The lithium sorbent can have any of the lithium adsorbing compositions known in the art. The lithium sorbent can be, for example, a spinel-type lithium manganese oxide (LMO), spinel-type lithium titanium oxide (LTO), or lithium intercalate material, such as lithium aluminum layered double hydroxide chloride (LiCl·2Al(OH)$_3$). LMO, LTO, and lithium aluminum layered double hydroxide chloride materials are described in detail in, for example, L. Li et al., *Johnson Matthey Technol. Rev.*, 62(2), 161-176, 2018 and V. P. Isupov, *Journal of Structural Chemistry*, 40(5), 672-685, 1999, the contents of which are herein incorporated by reference in their entirety.

In a particular lithium extraction process, the aqueous source solution is first passed (i.e., flowed) through a first zone (fluid path) or over a first surface of a lithium extraction composite containing the lithium sorbent material, wherein the lithium extraction composite can have a porous planar membrane, porous fiber, or porous tubular shape, or it can be an assembly of such composite devices. The first flow, described above, results in selective lithium intercalation in the lithium-selective sorbent material in the first zone. The phrase "over a first surface" or "over a second surface," as used herein, indicates that the solution is "in contact with" the first or second surface, respectively. The flowing step can be conducted by any suitable means, as well known in the art, including flowing the aqueous source solution in a downflow mode or an upflow mode. During passage of the aqueous source solution, lithium from the source solution is largely selectively extracted from the source solution into particles of the lithium sorbent while the remainder of the source solution resides in inter-particle spacings of the lithium sorbent. If non-lithium salt species (e.g., sodium, potassium, magnesium, and/or calcium) are also included in the source solution, the non-lithium salt species will remain substantially or completely unabsorbed and reside in the inter-particle volume (or support spacings) of the lithium sorbent occupied by the source solution.

Simultaneous with the flowing of the aqueous source solution described above, the lithium salt absorbed (i.e., captured) in the lithium sorbent is recovered by flowing an aqueous stripping solution through a second zone or over a second surface of the lithium extraction composite in which lithium ions from the first zone or first surface diffuse into. The flow with stripping solution may be referred to as the second flow. The aqueous stripping solution, before being flowed through the second zone, contains lithium salt (same or different from the lithium salt in the source solution) in a concentration of no more than or less than 50 wt. % or at least 500 ppm (mg/L) of the concentration of lithium in the starting aqueous source solution. The use of lithium salt in the stripping solution is to prevent the collapse of the structure of particulate composition. In order to obtain lithium salt with minimal presence of other non-lithium salt species, the stripping solution should be substantially bereft of metal ions (metal salts) other than lithium salts (lithium ions). Thus, the stripping solution, before flowing through the lithium extraction composite, should contain a lithium salt dissolved in water in the substantial absence of other dissolved species. The lower lithium concentration in the stripping solution provides the driving force for desorption of lithium salt from the lithium sorbent. In different embodiments, the stripping solution contains lithium salt, and independently, total salt, in a concentration of up to or less than 50, 40, 30, 20, 10, or 5 wt. % (or at least 500 mg/L) of the concentration of total salts in the starting aqueous source solution. The stripping solution, once passed through the lithium sorbent, may be further processed to further isolate or separate the lithium salt contained therein. For example, the spent strip may be concentrated, and the concentrated contents precipitated and/or crystallized and recrystallized.

In some embodiments, the first and/or second flows of the lithium extraction process are conducted at a temperature at about room temperature, i.e., about 25° C. In other embodiments, the first and/or second flows are conducted at a temperature above room temperature, i.e., at or above, for example, 30, 35, 40, 45, 50, 55, 60, 65, 70, 75, 80, 85, 90, 100, or 110° C., such as may be provided by a geothermal brine.

In particular embodiments, the lithium extraction composite is in the shape of a membrane having a first surface and a second surface, which may correspond to first and second zones, respectively, as described above. The membrane configuration is particularly suitable in a lithium extraction method in which the following steps are conducted: (i) establishing a first flow containing the aqueous source solution over the first surface; (ii) establishing a second flow containing the aqueous stripping solution over the second surface; and (iii) recovering lithium from the stripping solution. In some embodiments, the first flow is co-current with the second flow. In other embodiments, the first flow is countercurrent to the second flow. In some embodiments, the first flow is applied at a lower hydrostatic pressure than the second flow.

In some embodiments, the lithium extraction process employs a lithium-selective sorbent in conjunction with a permeable membrane material. Suitable sorbent compositions include an intercalated material that includes lithium and a three-dimensionally structured permeable activated alumina material, which can be used in the removal and recovery of lithium from solutions, particularly lithium salts from geothermal and other brines. Such an activated alumina lithium intercalate sorbent composition advantageously provides a controllable and maximum allowable lithium to aluminum ratio, and a favorable structural form of particulate media, thereby providing increased capacity for removal and recovery of lithium. In certain embodiments, the activated alumina lithium intercalate sorbent composition has a mole fraction of lithium to aluminum in the range of about 0.1 to 0.3, or about 0.1 to 0.33. The ratio of lithium to aluminum plays an important role in stabilizing the structural form of the material and maximizing the number of lithium sites available in the matrix for the loading and unloading of lithium from a brine solution.

As noted above, such alumina lithium intercalates can be integrated with permeable sheets and/or membranes that are compatible with brines. A variety of permeable sheets and/or membranes are suitable for this purpose, such as, for example, permeable sheets and membranes that are utilized for water treatment or filtration. Such permeable membranes or sheets can be made of any suitably mechanically stable and chemically resistant material, including polymers (e.g., fluoropolymers), carbon, metals, glasses, and ceramics. Composite materials, such as alumina, aluminum titanate, silicon carbide, magnesium aluminum oxide, manganese oxide, and silica, can also serve as supports or supportive layers for lithium sorbent materials. Similarly, such permeable membranes or sheets can be arranged in any suitable fashion that permits introduction of a brine to one side of the permeable membrane or sheet and collection of material from an opposing side that is not in direct fluid communication with the brine. For example, permeable sheets can be provided as a device that includes layers of such sheets separated by spacers, where such spacers define one or more pairs of serpentine fluid paths bounded by the permeable sheets. Alternatively, permeable membranes can be provided as hollow tubes or fibers, which can be incorporated into a device that provides contact with a brine on either the interior or exterior surface of the tubular membrane and collection of material from the opposing side. Regardless of the particular configuration, it is especially preferred that the membranes have a low permeability for water to achieve higher separation factors and minimize potential feed dilution.

In an embodiment of the lithium extraction process, a set of permeable membranes in the form of hollow fibers is provided within a housing, with the ends of the hollow fibers fluidically sealed to the ends of the housing (for example, by being set in a potting material, such as an epoxy resin). Such a housing can be provided with a fluid inlet and a fluid outlet that permit exposure of the outer surfaces of the hollow fibers to a desired liquid (for example, a brine), while the open ends of the hollow fibers at the ends of the housing provide access for a different fluid (for example, a stripping or extracting fluid) to the interior of the hollow fibers. Such an arrangement provides highly efficient transport of materials across the walls of the hollow fibers while being resistant to fouling and clogging.

In embodiments of the lithium extraction process, a lithium-selective sorbent is complexed with the material of a permeable sheet or membrane to produce a lithium sorbent membrane. Upon exposure of one side of such a lithium sorbent membrane to a lithium-containing brine, lithium ions are adsorbed into the lithium sorbent membrane. Such adsorbed lithium is extracted from the opposite side of the lithium sorbent membrane by exposing it to a stripping solvent (for example, an aqueous solution) that contains a lower lithium concentration than that of the brine on the opposing side of the lithium sorbent membrane. It should be appreciated that the transfer of lithium ions across the lithium sorbent membrane is driven by the free energy change (i.e., free energy exchange), and is not a result of either ion exchange or elevated hydrostatic pressure applied to the membrane. Counterions (for example, chloride) can also move across the permeable membrane in order to provide charge balance. In use, a brine can be supplied to such a device as a flow over the outer surfaces of the lithium sorbent membranes while a stripping solvent flows through the interior of the lithium sorbent membranes. Such flows can be in the same direction (i.e. co-current) or in opposing (i.e., counter-current) directions. It should be appreciated that since extraction of lithium is driven by the concentration gradient, high flow rates and elevated operating pressures are neither necessary nor desirable.

A number of parameters can be involved in providing an efficient process in which lithium sorbent membranes are used. One parameter is particle size, which can range from 20 nm to 1 μm or more. It should be appreciated that smaller particle sizes support the use of thinner membranes, which can improve permeation of lithium through the membrane. Another parameter is the concentration and distribution of lithium sorbent particles within a polymer matrix that forms part of a lithium sorbent membrane. A similar parameter can be the dispersion and concentration of alumina lithium intercalates within a permeable membrane (for example, a permeable ceramic or carbon layer). In either arrangement, loading of the lithium sorbent particles or lithium sorbent intercalates can range from 10% to 70% by weight. Yet another parameter is the pore size of the portion of the lithium sorbent membrane that is in direct contact with the brine. Such pore sizes can be less than 100 nm, 50 nm, 20 nm, 10 nm, or even less than 1 nm (for example, 0.4 nm to 0.7 nm). Such pore sizes will substantially prevent or minimize penetration of the coating solution into the porous support. A larger pore size will be useful in the event the particles are embedded in the support. Still other parameters are temperatures utilized in curing steps following production of a lithium sorbent membrane. These can range from about 60° C. to about 150° C., depending upon the properties of the polymer(s) utilized in lithium sorbent membrane production and/or the desired operating temperature of a system incorporating such a lithium sorbent membrane. For example, a lithium sorbent membrane intended for use in a system operating at a designated temperature can be subjected to a curing step at a temperature matching or exceeding the designated temperature prior to use.

The lithium sorbent composites described above, such as tubes, rods, or membranes, can be produced by a variety of methods, which can yield different functional geometries. In one embodiment, a lithium sorbent material (such as an alumina lithium intercalate) is prepared in the form of one or more particulates. The lithium sorbent material may be, for example, a lithium chloride intercalated aluminum hydroxide layer. Similarly, lithium chloride intercalated silica, lithium chloride transition metal oxides (such as titania, zirconia, hafnia, iron, cobalt, manganese, nickel, copper, silver, vanadium, niobium, tantalum, etc.) and rare earth oxides (such as yttria, ceria, lanthanum, etc.) can also be used, including mixtures of transition metal oxides. Once prepared, such lithium sorbent particles can be mixed with polymer precursors and applied to an existing permeable membrane or sheet. Suitable precursors include precursors for any of the polymers described above, such as precursors for polyvinyl chloride (PVC), polyvinylidene fluoride (PVDF), polyether ether ketone (PEEK), polyimide (PI), polyesters, polyamides, and polyethylenimine (PEI). Polymerization of the polymer precursors (for example, by UV irradiation, introduction of free radical sources, and/or introduction of cross linking agents) results in entrapment of the lithium sorbent particles in a polymer-stabilized layer associated with the permeable sheet or membrane to form a lithium sorbent membrane. The lithium sorbent particle content and polymer/cross linker composition, concentration, and/or ratio can be varied to adjust the lithium capacity, lithium release efficiency, and/or lithium selectivity of the resulting lithium sorbent membrane, where lithium selectivity is a measure of penetrance of other cations as determined by the formula below. In the case of a metal oxide support, the lithium sorbent particles can be mixed with a sol-gel precursor. Alternatively, the sorbent particles can be coated onto the final produced support of any of the organic or inorganic compositions provided above.

$$\text{Li Selectivity} = ([\text{Li}])/([\text{Ca}])$$

Figure 5:
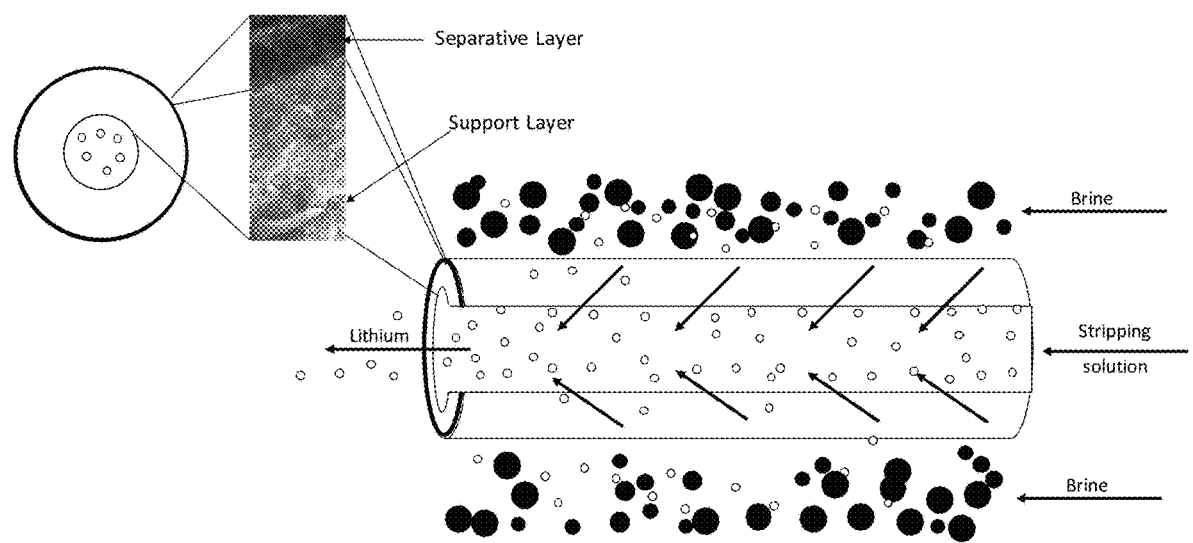
FIG. 5 is a drawing of an exemplary lithium sorbent membrane in tubular configuration.
Figure 6:
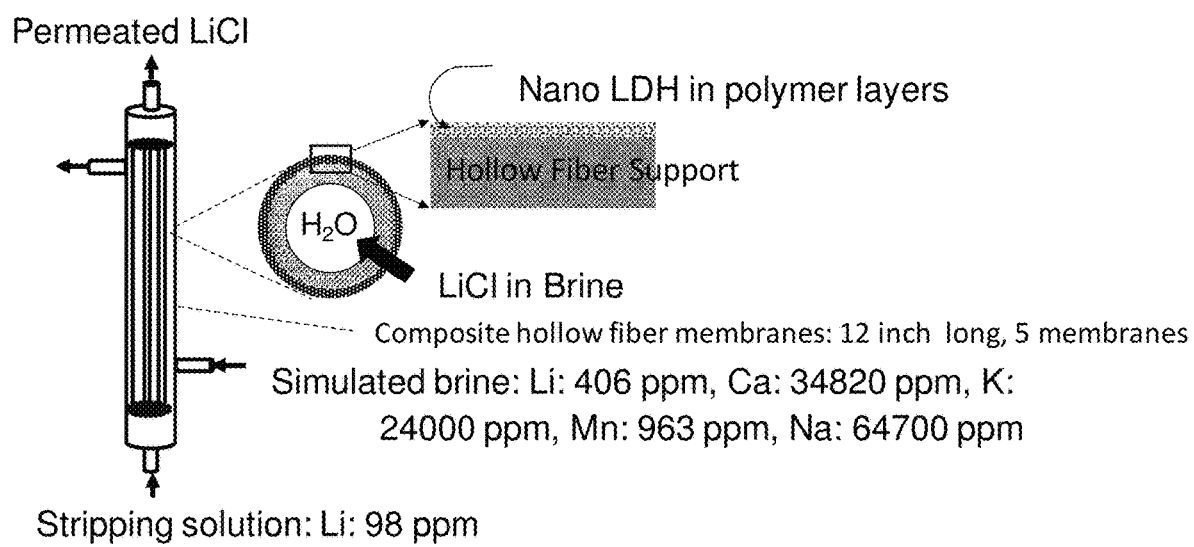
FIG. 6 is a drawing of an exemplary hollow fiber composite produced as described herein.
Figure 7:
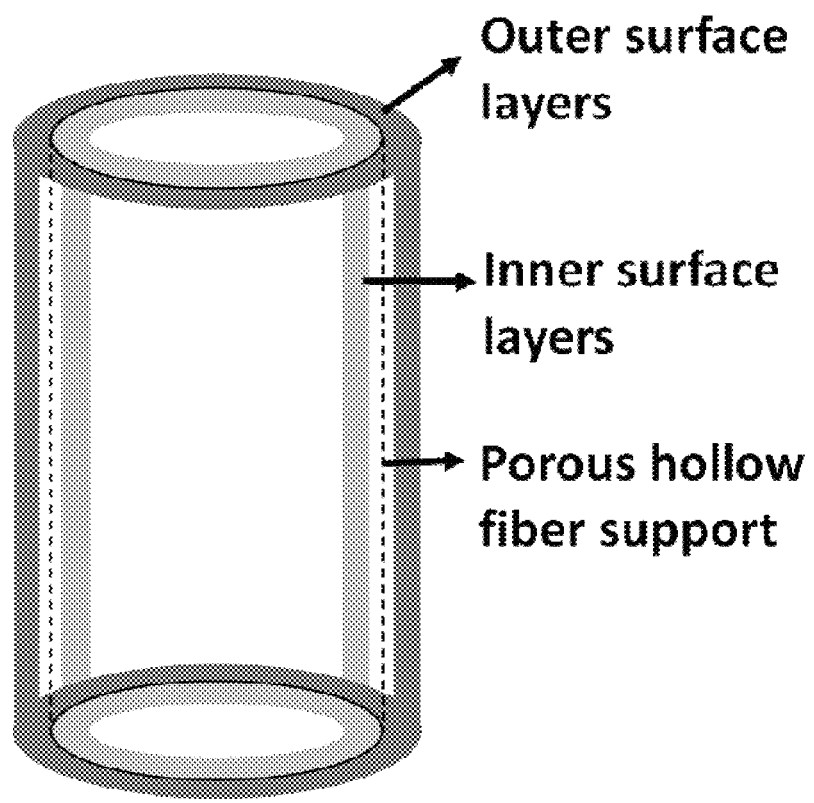
FIG. 7 is a drawing of an exemplary system for extraction of lithium from a brine using a hollow fiber filter module incorporating a porous hollow fiber support along with inner and outer surface layers of lithium sorbent material.

In the above equation, [Li] is lithium concentration and [Ca] is cation concentration in solution, for example, concentration of calcium, potassium, or sodium. An example of such a lithium sorbent membrane is shown in FIG. 5. The lithium sorbent membrane comprises an inner separative layer and an outer support layer. A composite hollow fiber filter membrane may also be used, as depicted in FIG. 6. To form the composite hollow fiber filter membrane, hollows can first be coated with a lithium selective sorbent (e.g., lithium aluminum double hydroxide, i.e., LDH) followed by potting the hollow fibers into conventional hollow fiber filter housing to result in a hollow fiber filter module. In some embodiments, to coat the hollow fibers, a mixture of gibbsite $Al(OH)_3$ (10 to 20 nm) is mixed with LiOH, with 10 to 20 percent excess LiOH, as a one-to-one molar ratio in water to form a mixture with a one-to-two molar ratio of Li to Al. The mixture is neutralized with HCl at ambient temperature to form alumina lithium intercalate. PVDF in aqueous solution is added to the suspension, along with a cross-linking agent (e.g., Picassian® XL-702). Coating of hollow fibers can be achieved by submerging the fibers in this mixture and then allowing the fibers to air dry at 115° C. for 1 hour. An example of a system for extraction of lithium from a brine using a hollow fiber filter module incorporating such fibers is shown in FIG. 7.

Such an approach can be used to generate a variety of lithium sorbent membrane geometries. In one embodiment, a layer of such polymer-stabilized lithium sorbent particles is deposited on one surface of a permeable membrane (for example, an external surface of a hollow fiber). In another embodiment, two or more layers of polymer-stabilized lithium sorbent particles are deposited sequentially on the same surface of a permeable membrane to produce a multilamellar lithium sorbent membrane. In such embodiments, successive layers of polymer-stabilized lithium sorbent particles can have substantially the same composition. Alternatively, in other embodiments successive layers of polymer-stabilized lithium sorbent particles of a multilamellar membrane can have different compositions (for example, different particle sizes, concentrations, and/or compositions). In still other embodiments, such layers of polymer-stabilized lithium sorbent particles can be applied to both sides of a permeable membrane (for example, to both exterior and interior surfaces of a hollow fiber). In such embodiments, either one or both surfaces of the permeable sheet or membrane can include two or more layers of polymer-stabilized lithium sorbent particles.

In another embodiment, a lithium selective composite membrane can be produced by producing a lithium sorbent composition (for example, an alumina lithium intercalate) within an existing permeable membrane or sheet. In such an embodiment, one or more precursors of a lithium sorbent composition can be introduced to a permeable membrane or sheet, and then conditions can be adjusted (for example, by providing an additional precursor, altering pH, altering temperature, altering ionic strength, etc.) to cause the formation of a lithium sorbent composition in situ within the material of the permeable membrane or sheet. For example, a permeable membrane (for example, a hollow fiber) can be exposed to a mixture of alumina and LiOH (in proportions and under conditions suitable for forming an alumina lithium intercalate) that is flowed along one side of a permeable membrane (for example, the interior volume of a hollow fiber). In some embodiments, conditions can be selected to produce lithium sorbent particulates dimensioned to enter the material of the permeable membrane or sheet (for example, from about 1 nm to about 50 nm). Removal of unreacted and unretained materials provides a lithium sorbent membrane configured as a permeable membrane or sheet that is impregnated with a lithium sorbent composition. It should be appreciated that, in some embodiments, such impregnated lithium sorbent membranes can additionally be coated on either or both sides with one or more layers of polymer stabilized lithium sorbent particles, as described above.

In operation, one or more of such lithium sorbent membranes can be provided in a housing that includes at least two fluidically isolated paths, where such paths are joined for at least part of their length by a lithium sorbent membrane. Passage of a lithium-containing brine (for example, a geothermal brine) along a brine fluid path and a stripping solution along an adjacent stripping fluid path that is coupled to the brine fluid path by a lithium sorbent membrane results in the continuous extraction of lithium from the brine and transfer of the removed lithium to the stripping fluid. As used herein, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. In some embodiments, the stripping fluid is an aqueous fluid having a lower lithium content than that of the brine. Since energy for the transfer of lithium across the lithium sorbent membrane is a function of the free energy represented by the concentration gradient across the lithium sorbent membrane, the process can take place in the absence of elevated pressure (for example, as used in ultrafiltration or nanofiltration technologies). Similarly, since lithium transfer is not accomplished by ion exchange, the process can take place in the absence of an eluting and/or regenerating step(s). This advantageously simplifies the lithium extraction process and dramatically reduces equipment and power requirements. In some embodiments of the inventive concept, power can be provided from geothermal energy supplied by the source of a geothermal brine that is being processed for lithium extraction.

In some embodiments, the lithium selective membrane comprises: a first lithium extractant (sorbent); and a permeable membrane, wherein the extractant is coupled to the permeable membrane. In some embodiments, the permeable membrane is configured as at least one hollow fiber. In further embodiments, the first lithium extractant is or includes lithium sorbent particles, such as particles of a lithium alumina intercalate. The first lithium extractant may, in some embodiments, be formed via in situ synthesis within the permeable membrane. The lithium selective membrane may also include a first stabilizing polymer. In some embodiments, the lithium selective membrane further includes a surface and a first layer, wherein the first layer includes the first lithium extractant incorporated in the first stabilizing polymer, and wherein the first layer is coupled to the surface. In further embodiments, the lithium selective membrane further includes a second layer, wherein the second layer includes a second lithium extractant incorporated in a second stabilizing polymer, and wherein the second layer is coupled to the first layer. In some embodiments, the second layer is not identical to (i.e., is different from) the first layer. In some embodiments, the surface is an outer surface or inner surface of the permeable membrane.

In other embodiments, a membrane extraction unit is used for recovering lithium from brines, wherein the membrane extraction unit may include: a first fluid path that is in contact with (e.g., in fluid communication with) a brine feed; a second fluid path that is in contact with or in fluid communication with a stripping fluid; and a lithium sorbent membrane interposed between the first fluid path and the second fluid path so as to permit transport of lithium from the brine feed to the stripping fluid. The membrane extraction unit may further include a housing, wherein the housing includes a first inlet and a first outlet that are in fluid communication with the first fluid path, and a second inlet and a second outlet that are in contact with the second fluid path. In some embodiments, the lithium sorbent membrane is configured as at least one hollow fiber, wherein the at least one hollow fiber includes an external surface that is in contact with the first fluid path, and wherein the lithium sorbent membrane further includes an interior lumen that is in contact with the second fluid path.

In other embodiments, the lithium extraction process involves selectively transferring lithium from a lithium-containing brine by the following process: providing a lithium sorbent membrane (e.g., containing an alumina lithium intercalate) having a first surface and a second surface; establishing a first flow of the lithium-containing brine over the first surface; establishing a second flow of a stripping solution over the second surface; and recovering lithium from the stripping solution. In some embodiments, an initial lithium concentration of the stripping solution is lower than a lithium concentration of the lithium-containing brine. In some embodiments, the first flow is co-current with the second flow, while in other embodiments, the first flow is counter-current to the second flow. In some embodiments, the first flow is not applied at a significant hydrostatic pressure, or the first flow is applied at a lower hydrostatic pressure than the second flow.

The lithium extraction process may employ a lithium extraction composite that includes (i) a solid porous support having at least one (e.g., an inner and/or outer surface), and (ii) particles of a lithium-selective sorbent material (i.e., "lithium sorbent material") coated on the at least one surface. In some embodiments, the particles of lithium sorbent material are also partially or entirely embedded below the surface of the support or within the support. The support is porous to permit flow of liquid, and more particularly, to permit permeation of lithium (as selectively extracted from the brine) into the stripping solution. The support needs to be porous to allow the ions and solution to access the sorbent material. The support can have any of the inorganic or organic compositions described above for the WPS. In contrast to the support, the sorbent material is substantially or completely impermeable to solution transfer, so that the predominant or only way the lithium is transported from one side of the membrane to the other is by transport through the sorbent material. This prevents mixing of the brine with the extracting material (stripping solution). For example, in some embodiments, the lithium extraction membrane composite comprises: (i) a porous support and (ii) particles of a lithium-selective sorbent material coated along with an impermeable material on inner and/or outer surfaces of the support, wherein the support has a planar, fiber (e.g., rod or cylindrical), or tubular shape. In some embodiments, the lithium extraction composite is a two-layer system in which a porous support is coated with a layer of lithium sorbent, and the lithium sorbent embedded in an impermeable material that is not porous but allows only lithium ions to pass through. Three-layer, four-layer, and higher multi-layer systems may be used. For example, in some embodiments, a porous hollow fiber material (such as PVDF) is coated with one or more layers of a lithium sorbent mixed with the support material (e.g., PVDF) and a crosslinker. In the foregoing example, the PVDF and crosslinker function as an impermeable material while the lithium sorbent permits lithium ions (or lithium salt) to pass through the membrane while blocking other ionic species.

The support is typically thermally stable at a temperature of at least or above 50° C., 60° C., 70° C., 80° C., 90° C., 100° C., 110° C., 120° C., 130° C., 140° C., or 150° C. The term "outer surface" refers to the outermost surface of the support that defines the shape of the support. The term "inner surface" refers to surfaces of the support that are within the bounds of the outer surface, such as typically found in porous and high surface area materials. For purposes of the invention, the support is of macroscopic size (generally, at least 1 cm in at least one dimension) and has a planar porous membrane (i.e., "membrane"), porous fiber (porous rod), or porous tubular shape. The tubular shape may be, for example, a hollow fiber or tube, with hollow fibers generally having an outer diameter of less than 1 mm (1000 microns) and tubes generally having an outer diameter of greater than 1 mm. In some embodiments, the "inner surface" refers to the inner contours of a hollow shape, such as a hollow fiber or tube. The lithium sorbent may be coated onto an outer surface, inner surface, or both. In the case of a planar (membrane) support geometry, the support possesses opposing (e.g., top and bottom) surfaces, in which case one or both of the surfaces may be coated with the sorbent material. One, two, three, four, or more additional layers of the support and/or the sorbent material may also be included.

In particular embodiments, the support is in the shape of a macroscopic planar membrane (i.e., "membrane") typically having a length of at least 1 cm for each side of the membrane and a thickness of at least 1, 5, or 10 mm. In some embodiments, the membrane is a single layer membrane, which is seamless across its thickness dimension. In other embodiments, the membrane is multi-layer (e.g., two-layer, three-layer, or higher-layer) membrane, which is characterized by the presence of discrete transitions (either by differences in composition or physical structure between layers) from one layer to the next across the thickness dimension of the membrane. In some embodiments, one or more gaps or channels are present between one or more layers in a membrane. The one or more gaps or channels are generally present to permit flow of the lithium source solution and/or the lithium stripping solution. Thus, the gaps or channels may represent different zones for liquid flow in the composite membrane. In another particular set of embodiments, the support is in the shape of one or a multiplicity of macroscopic porous tubes, fibers, or rods, wherein the lithium sorbent material is coated on or embedded in the surface and/or the interior of the tubes or rods. The macroscopic tubes or rods generally have a length of at least 1 cm and a thickness (diameter) of at least 1, 5, or 10 mm.

Examples have been set forth below for the purpose of illustration and to describe certain specific embodiments of the invention. However, the scope of this invention is not to be in any way limited by the examples set forth herein.

EXAMPLES

Overview

As further discussed below, a concentrated pure LiCl solution was recovered from a naturally occurring brine using a forward osmosis composite membrane. The process produced a greater than 99.5 wt. % pure LiCl solution without losing any LiCl to the brine/draw solution. It is herein demonstrated that a polymer-based composite membrane can selectively remove water from dilute LiCl solution using a second salt solution, such as lithium depleted brine as a draw solution, without permeating any cations from the brine/draw solution to the LiCl solution. A robust, thin, and dense polyvinylidene difluoride (PVDF/Kynar®) membrane layer was deposited on a commercial porous hydrophilic PVDF/Kynar® hollow fiber support, wherein Kynar is a trade name of a commercially available PVDF. The high temperature tolerant and relatively inexpensive PVDF membrane has herein been found suitable for concentrating a LiCl solution recovered from geothermal brine to achieve a final concentration of up to 40 wt. %. While reverse osmosis membranes are used for water desalination, LiCl solutions produced from geothermal brine cannot be treated with reverse osmosis membrane due to temperature limitations of the polyamide membranes and high osmotic pressure. Furthermore, reverse osmosis is an energy intensive process compared to the forward osmosis process.

In the forward osmosis process, a LiCl solution (1 wt. %) obtained from the eluent of the sorption column used for extraction of LiCl from geothermal brine is fed into the membrane system, and water is selectively transferred from the LiCl solution to the draw solution through the diffusion mechanism. The FO process utilizes the abundantly available spent geothermal brine depleted in lithium as the draw solution which contains NaCl, KCl, $MgCl_2$ and $CaCl_2$ with a low concentration (<300 ppm) of LiCl with an estimated osmotic pressure of about 200-250 bar. The osmotic pressure difference between the dilute LiCl solution and the draw solution provides a high driving force for water transfer from the feed LiCl solution to the draw solution. The process does not require the application of any external pressure or use of any additives in the draw solution for dewatering of LiCl solution as it takes advantage of the high chemical potential gradient provided by the high salinity brine. The major benefits of using a forward osmosis membrane for increasing the concentration of LiCl solution are saving energy and time, high recovery, high product purity and cost effectiveness. Moreover, the membrane-based concentration approach is very scalable and has high potential for commercialization as a scalable hollow fiber module system was used which has the advantages of high packing density, lower energy and maintenance cost, and easy fabrication compared to the flat-sheet and spiral wound configuration.

First, a thin dense PVDF/Kynar® layer was deposited onto a porous hydrophilic PVDF hollow fiber support using a dip coating method. The membrane fabrication parameters such as number coating layers, coating solution concentration, cross linker concentration and curing temperature, and the LiCl concentration process parameters such as operating temperature, were optimized to obtain the best performance of the membrane for increasing the concentration of the LiCl solution while maintaining its purity. Furthermore, the long-term stability of the membrane was studied for concentrating LiCl solution for more than 400 hours. The membrane showed greater than 99.5 wt. % pure LiCl solution with a nearly four-fold higher concentration of its initial solution without transfer of any LiCl from the feed solution into the draw solution.

Fabrication Procedure for the PVDF-Kynar®/Hollow Fiber Membrane Module

A new neat Kynar-PVDF® hollow fiber membrane module was fabricated containing 45 fibers of 10-inch long and 0.5 mm in outer diameter and 0.5 mm in inner diameter. The total membrane area of this module was about 0.018 $m^2$. In a typical synthesis, the hydrophilic fibers were pre-treated by soaking them in water at 90° C. for 1 hour followed by air drying for 1 hours at 60° C. To prepare a coating solution, 800 mL of water was mixed with 19.9 gm of Kynar®-PVDF solution and 2.12 gm of XL702 binder. This solution was used to provide coatings on the outside wall of fibers. To deposit the membrane coating, the fibers were mounted on a stand using fine metal wires. For each coating, the fibers were dipped into the solution for about 1 minute followed by 2 hours of air drying before subsequent coating. After completion of the membrane coating, they were dried for 12-16 hours in air. To optimize the thickness of the membrane, the number of coatings was varied from 1 to 3. After final drying, the fibers were cured at 80° C., 95° C., and 115° C. for 1.5 hours with 1° C./min of heating and cooling rates and the effect of curing temperature was studied on the LiCl concentration performance.

The cured fibers were then placed into a 12-inch-long PVDF tube with both ends potted using Bondit B45-TH epoxy (12-16 hours curing at room temperature for each end potting). The module fabrication was completed by making the end connections for tube and shell side flows. To avoid the potential for any leakage, a small amount of epoxy was applied around the threaded fittings on the modules. The module was tested for integrity prior to the start of LiCl concentration experiment using nitrogen gas flow test.

Figure 8:
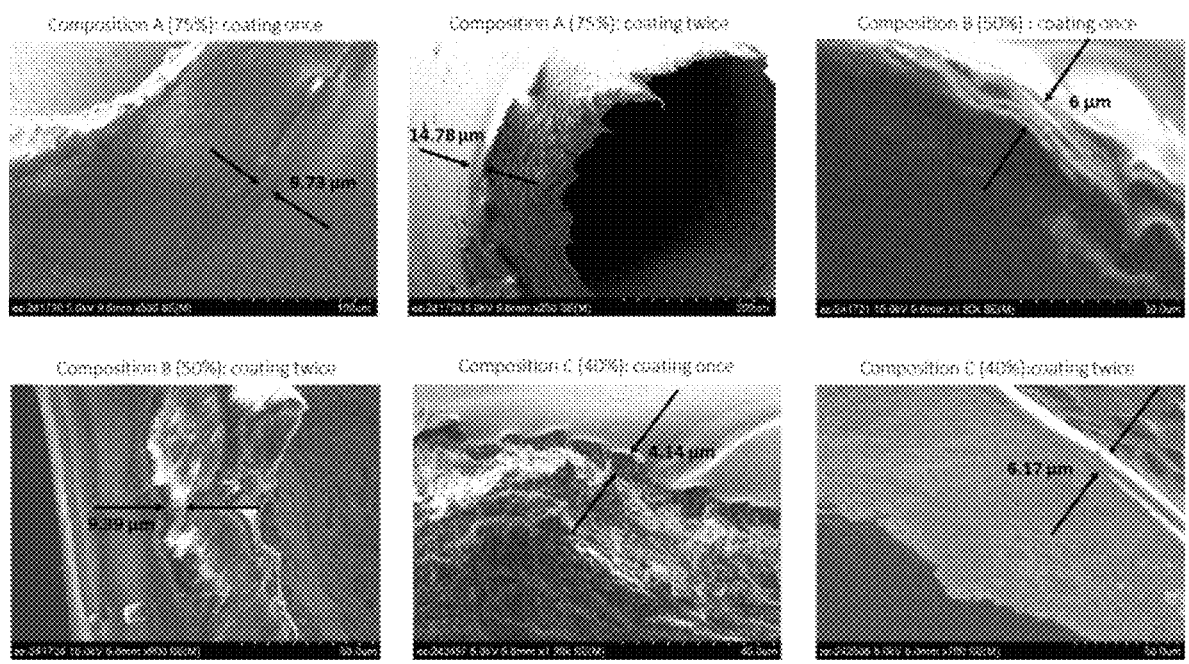
FIG. 8 shows SEM images (in multiple panels) of cross-sections of hollow fibers coated with various concentrations of Kynar®/PVDF coating with one and two coating layers. (a) Top-left panel: Composition A (75% Kynar®/PVDF), coating once; (b) Top-middle panel: Composition A, Coating twice; (c) Top-right panel: Composition B (50% Kynar®/PVDF), coating once; (d) Bottom-left panel: Composition B, coating twice; (e) Bottom-middle panel: Composition C (40% Kynar®/PVDF), coating once; (f) Bottom-right panel: Composition C, coating twice.

After depositing the PVDF membrane layer on the hollow fiber support, the thickness of the membrane was determined by the SEM analysis using a sample of a single hollow fiber. Membranes with different thicknesses were prepared using both concentrated and dilute coating solutions as shown in Table 1 below. The coating solution of 800 mL of water with 23.77 gm of Kynar®-PVDF solution and 2.12 gm of XL702 binder is considered as the 100% concentration. The concentrated coating solution was further diluted to 75%, 50%, and 40% of the original concentration by adding water. Furthermore, the number of coating layers was varied from one to three in order to investigate the effect on membrane thickness. The cross-sectional SEM images of fibers using various coating combinations and coating layers are shown in FIG. 8 as follows: (a) Panel top-left: Composition A (75% Kynar®/PVDF), coating once; (b) Panel top-middle: Composition A, Coating twice; (c) Panel top-right: Composition B (50% Kynar®/PVDF), coating once; (d) Panel bottom-left: Composition B, coating twice; (e) Panel bottom-middle: Composition C (40% Kynar®/PVDF), coating once; (f) Panel bottom-right: Composition C, coating twice. It was observed that by reducing the coating concentration to 40% of the original concentration and by using 2 coating layers, the thickness of the coating reduced to 6.17 μm.

TABLE 1

Compositions of diluted coating solutions used to prepare 800 mL solution in DI water in order to analyze the thickness of coating layer using SEM analysis.

| | Kynar/PVDF coating (gm) | XL-702 binder (gm) |
|---|---|---|
| Composition A (75%) | 22.27 | 2.39 |
| Composition B (50%) | 14.85 | 1.59 |
| Composition C (40%) | 11.88 | 1.27 |

A membrane module referred to Module 1 was fabricated by depositing a PVDF-Kynar® layer using a coating solution of 800 mL of water with 23.77 gm of Kynar®-PVDF solution and 2.12 gm of XL702 binder. The membrane module contained 25 hollow fibers with 10 inch in length which resulted in a surface area of 0.01 $m^2$.

LiCl Solution Concentration

Figure 9:
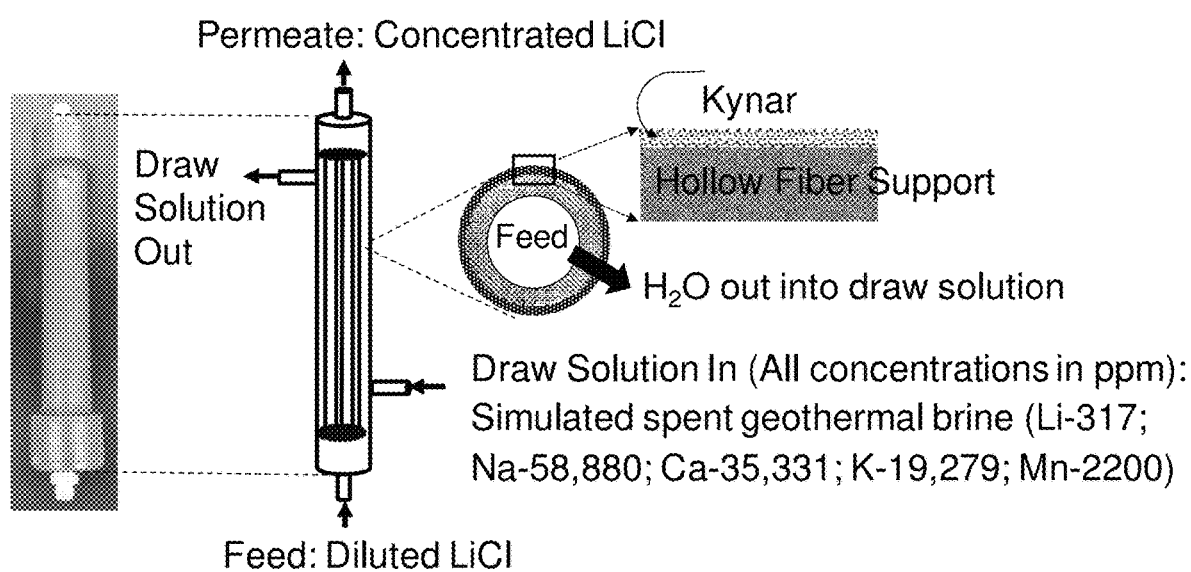
FIG. 9 is a schematic of PVDF-Kynar® hollow fiber membrane configuration.
Figures 10A, 10B, 10C:
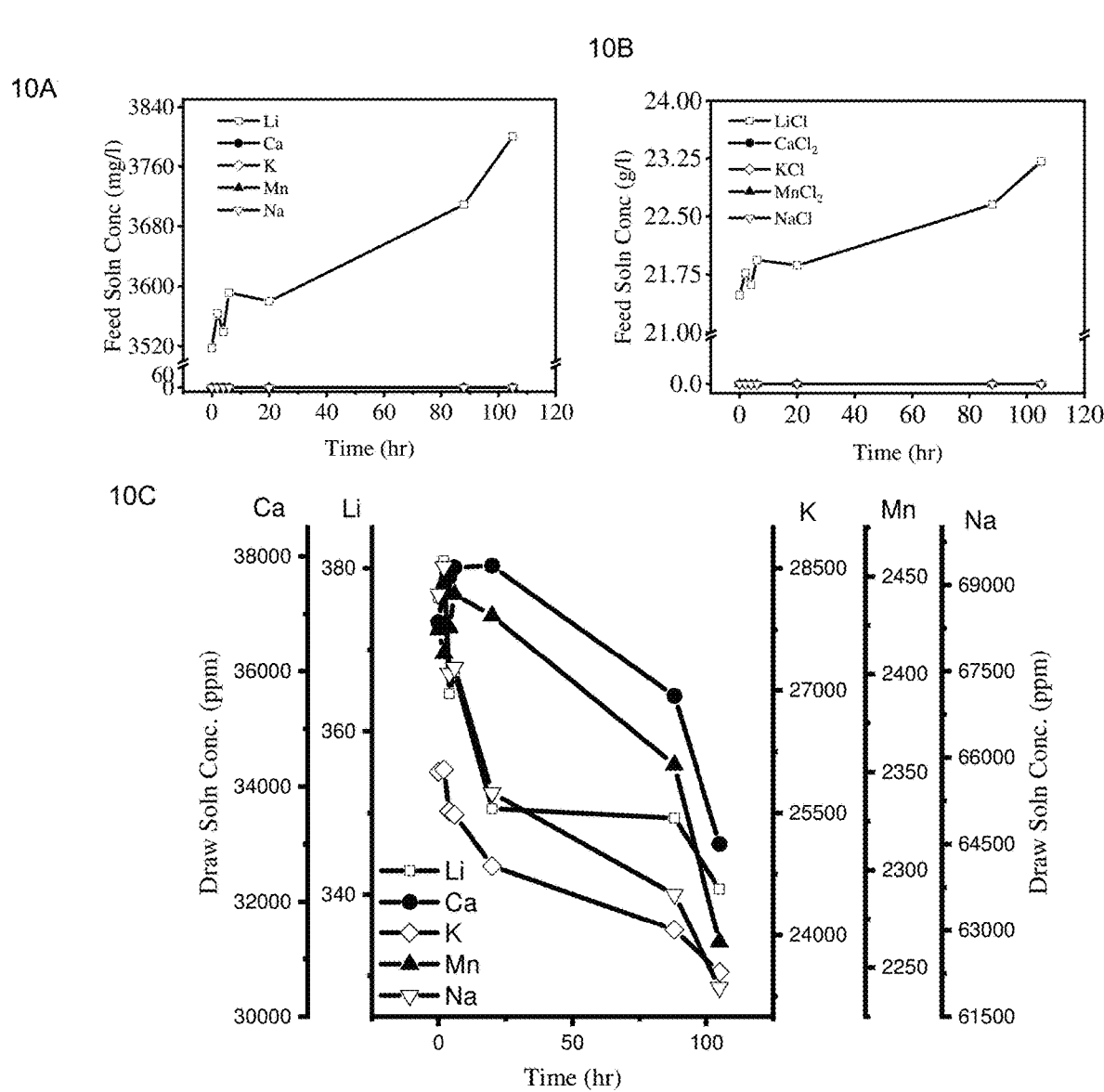
FIGS. 10A-10C are results of concentration experiments at an operating temperature of 25° C. using a hollow fiber membrane module coated with three layers of Kynar®-PVDF cured at 115° C. (module 1).
Figure 11A:
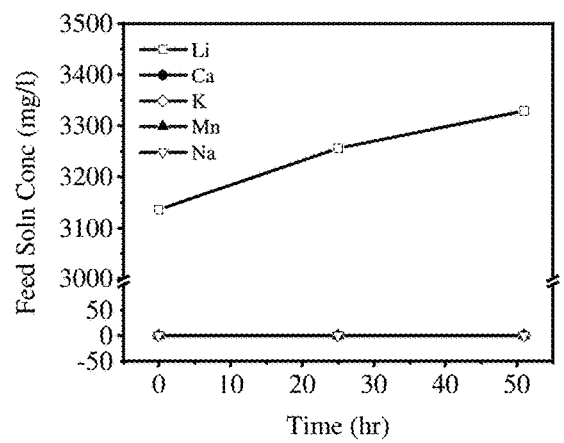
FIGS. 11A-11C are results of concentration experiments at an operating temperature of 50° C. using a hollow fiber membrane module coated with three layers of Kynar®-PVDF cured at 115° C. (module 1).
Figure 11B:
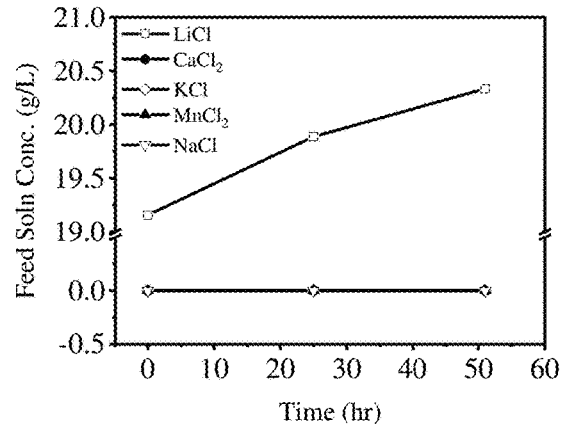
Figure 11C:
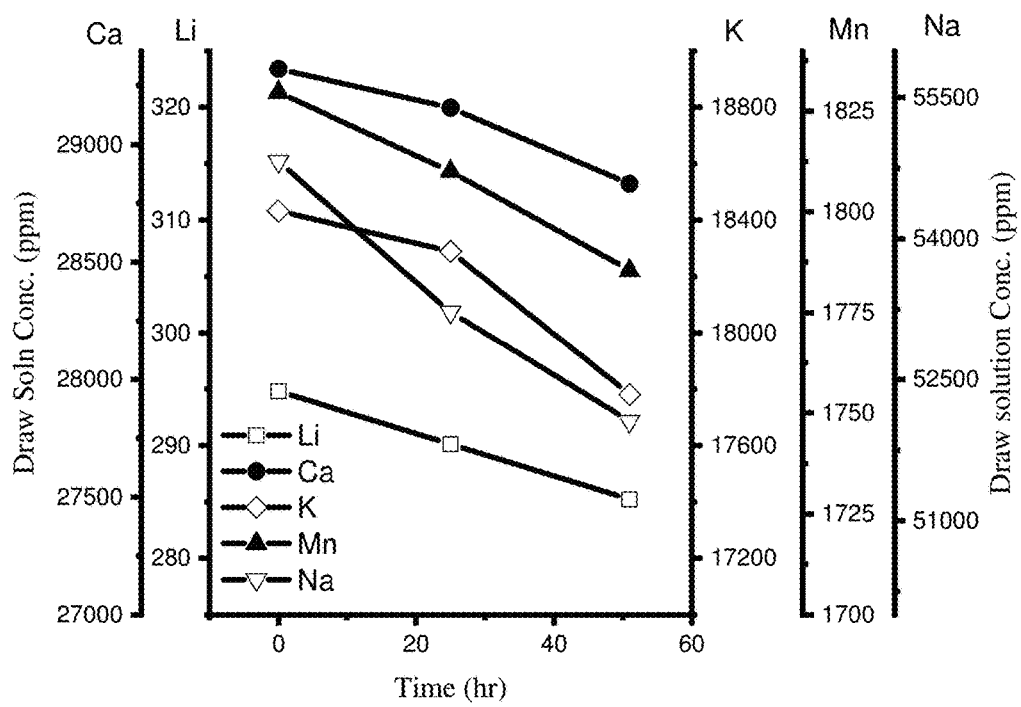
Figure 12A:
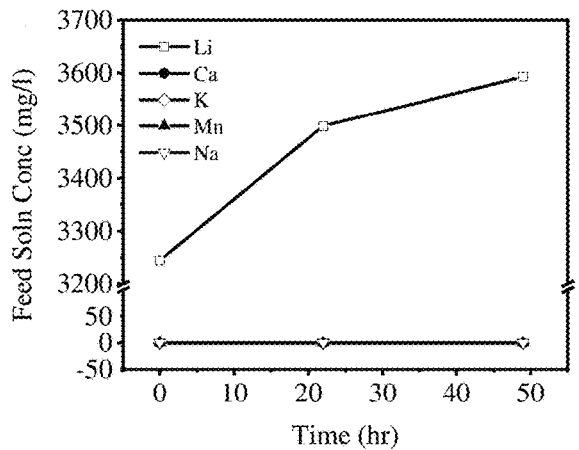
FIGS. 12A-12C are results of concentration experiments at an operating temperature of 70° C. using a hollow fiber membrane module coated with three layers of Kynar®-PVDF cured at 115° C. (module 1).
Figure 12B:
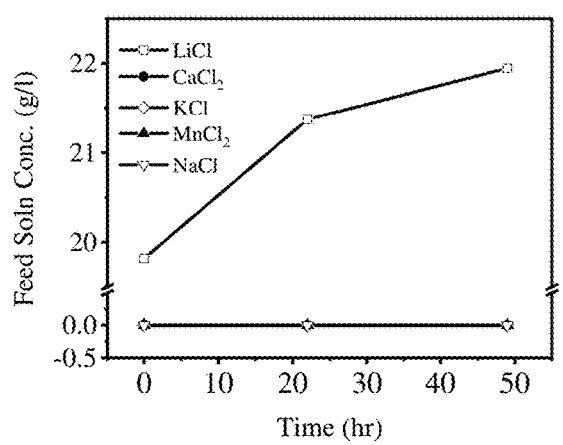
Figure 12C:
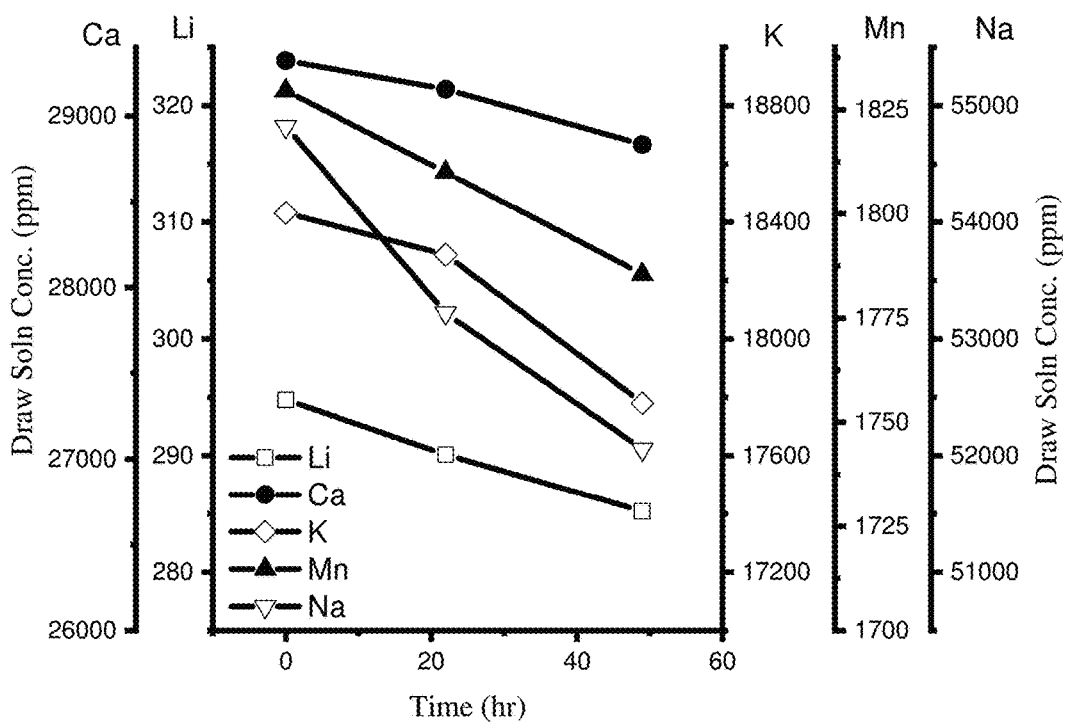

After successful fabrication, the performance of the membrane module was evaluated for concentrating the LiCl solution at 25° C., 50° C. and 70° C. FIG. 9 shows the process flow diagram and system configuration for the LiCl concentration. The feed solution was the simulated sorbent column strip/eluent with an initial Li concentration of about 3180 mg/L (19.43 g/L, LiCl) as shown in FIG. 10A. Freshly prepared simulated brine was used as the draw solution. The composition of a simulated brine is presented in FIG. 10C. FIGS. 10A-10C, 11A-11C, and 12A-12C show the results of the LiCl concentration experiment with neat Kynar®-PVDF supported on the commercially prepared hydrophilic hollow fibers at 25° C., 50° C. and 70° C., respectively. FIGS. 10A-10C are results of concentration experiments at an operating temperature of 25° C. using a hollow fiber membrane module coated with three layers of Kynar®-PVDF cured at 115° C. (module 1). FIG. 10A shows results for the feed solution cation concentration. FIG. 10B shows results for the feed solution salt concentration. FIG. 10C shows results for the draw solution cation concentration. FIGS. 11A-11C are results of concentration experiments at an operating temperature of 50° C. using a hollow fiber membrane module coated with three layers of Kynar®-PVDF cured at 115° C. (module 1). FIG. 11A shows results for the feed solution cation concentration. FIG. 11B shows results for the feed solution salt concentration. FIG. 11C shows results for the draw solution cation concentration. FIGS. 12A-12C are results of concentration experiments at an operating temperature of 70° C. using a hollow fiber membrane module coated with three layers of Kynar®-PVDF cured at 115° C. (module 1). FIG. 12A shows results for the feed solution cation concentration. FIG. 12B shows results for the feed solution salt concentration. FIG. 12C shows results for the draw solution cation concentration.

The concentration of all of the cations in the brine/draw solution steadily decreased with time suggesting the dilution of brine due to transfer of water from feed solution was attributed to the phenomenon of forward osmosis. The LiCl concentration increased with time for all experiments conducted in the temperature range of 25–70° C. as shown in FIGS. 10A-10C, 11A-11C, and 12A-12C. The concentration profile of both the lithium and LiCl solution, and the draw solution operated at 25° C. are presented in FIGS. 10A-10C. Although the concentration of the LiCl solution at 50 hours is a little lower than that at 40 hours, it increased again at 60 hours, which may be due to not proper mixing of the solutions. The concentration of LiCl solution increased from 21 g/L to 23 g/L in 105 hours Interestingly, there was no cation transfer from the brine solution to the LiCl solution which indicates the membrane is defect free. The concentration of the cations in the draw solution slowly decreased with time which is expected as water transferred from the feed solution to the draw solution through diffusion across the membrane. However, the sodium and potassium concentration in the draw solution at 100 hours is slightly higher than that at 90 hours which is probably due to improper mixing of the solution. The decrease in the concentration of the draw solution is much slower than that of the LiCl feed solution. That is because the volume of the draw solution was 3 L whereas it was 1 L for the feed solution. In the event the membrane is applied at an industrial scale, brine will be supplied continuously which will result in maintaining a nearly constant brine solution concentration.

The lithium chloride concentration further increased at 50° C. and 70° C. without transfer of any cations from the brine solution to the LiCl solution as shown in 11A-11C and 12A-12C. The water flux was 35 mL/m$^2$/h, 67.8 mL/m$^2$/h and 165.2 mL/m$^2$/h at 25° C., 50° C., and 70° C., respectively. This study demonstrated that the membrane is stable and maintained its integrity for a total cumulative time of about 200 hours.

Effect of Membrane Curing Temperature on LiCl Concentration Performance

Kynar®/PVDF exists in α phase predominantly above 100° C. At lower temperature, the crystallinity is believed to be primarily β phase. In order to investigate the effect of curing temperature and phase crystallinity on water permeability of the membrane module, the fibers were cured at a reduced curing temperature of 95° C. for 1.5 h with 1° C./min of heating and cooling rates, after final drying. A new neat Kynar®-PVDF/hollow fiber membrane module (Module 2) with 50 fibers, 10-inch long and 0.5 mm in inner diameter was fabricated. The total membrane area of this module was about 0.02 m$^2$ (50 fibers).

Figure 13A:
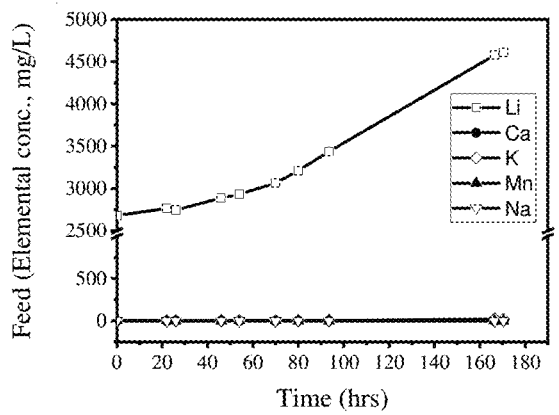
FIGS. 13A-13C are results of concentration experiments at an operating temperature of 50° C. using a hollow fiber membrane module coated with three layers of Kynar®-PVDF cured at 95° C. (module 2).
Figure 13B:
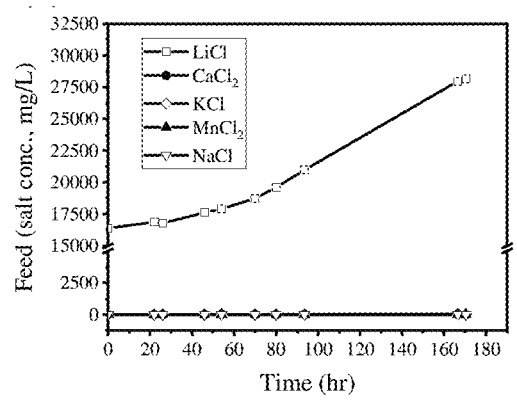
Figure 13C:
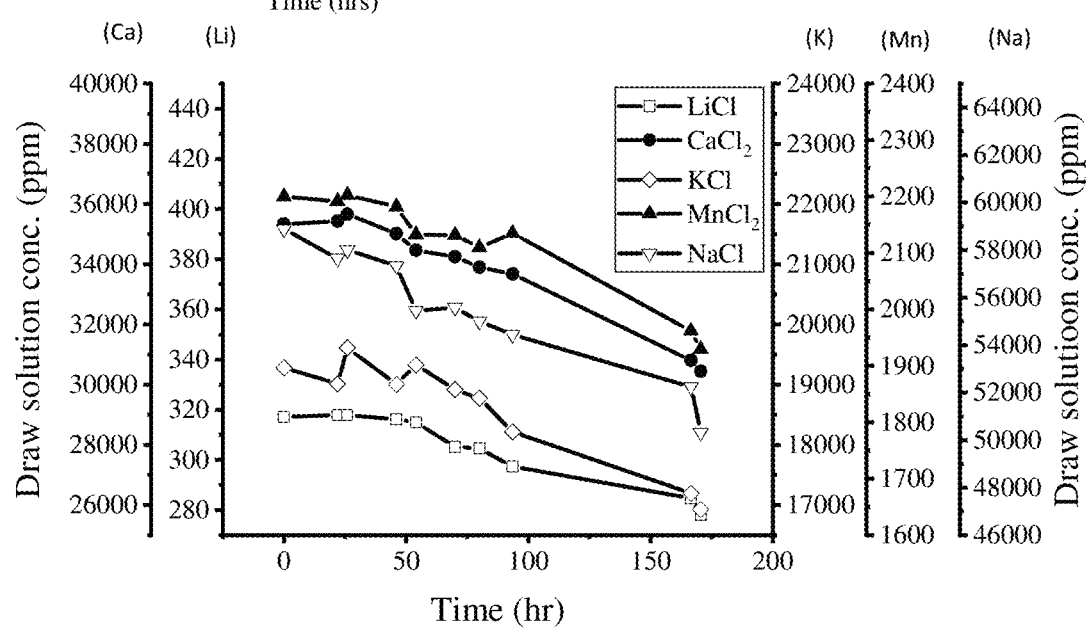

The feed solution was the simulated sorbent column strip/eluent with an initial Li concentration of about 2680 mg/L (16.37 g/L, LiCl) as shown in FIG. 13A. Freshly prepared simulated brine with depleted lithium content was used as the draw solution. The composition of the simulated brine is presented in FIG. 13C. The operating temperature was maintained at 50° C. FIGS. 13A-13C show the results of the LiCl concentration experiment with neat Kynar®-PVDF supported on the commercially prepared hydrophilic hollow fibers cured at 95° C. (module 2) and operated at 50° C. FIG. 13A shows results for the feed solution cation concentration. FIG. 13B shows results for the feed solution salt concentration. FIG. 13C shows results for the draw solution cation concentration. The concentration of all the cations in the brine/draw solution steadily decreased with time indicating the dilution of brine due to transfer of water from feed solution attributed to the phenomenon of forward osmosis while the LiCl concentration on the feed side increased with time. There was no cation transfer from the brine solution to the LiCl solution. This indicates the membrane is defect free. The concentration of the cations in the draw solution slowly decreased with time which is expected as water transferred from the feed solution to the draw solution through diffusion across the membrane.

The results indicate that the lithium chloride concentration further increased without transfer of any cations from the brine solution to the LiCl solution. This study demonstrated that the membrane is stable and maintained its integrity for a total cumulative time of about 170 hours. The water flux with the membrane cured at 95° C. was 143 mL/m$^2$/h whereas it is only 67.8 mL/m$^2$/h for the membrane cured at 115° C. A higher water flux at lower curing temperature is attributed to the β phase of the Kynar®/PVDF layer which favors more water transfer while preventing the permeation of any cations from draw solution.

Effect of Membrane Thickness on LiCl Concentration Performance

Figures 14A, 14B, 14C:
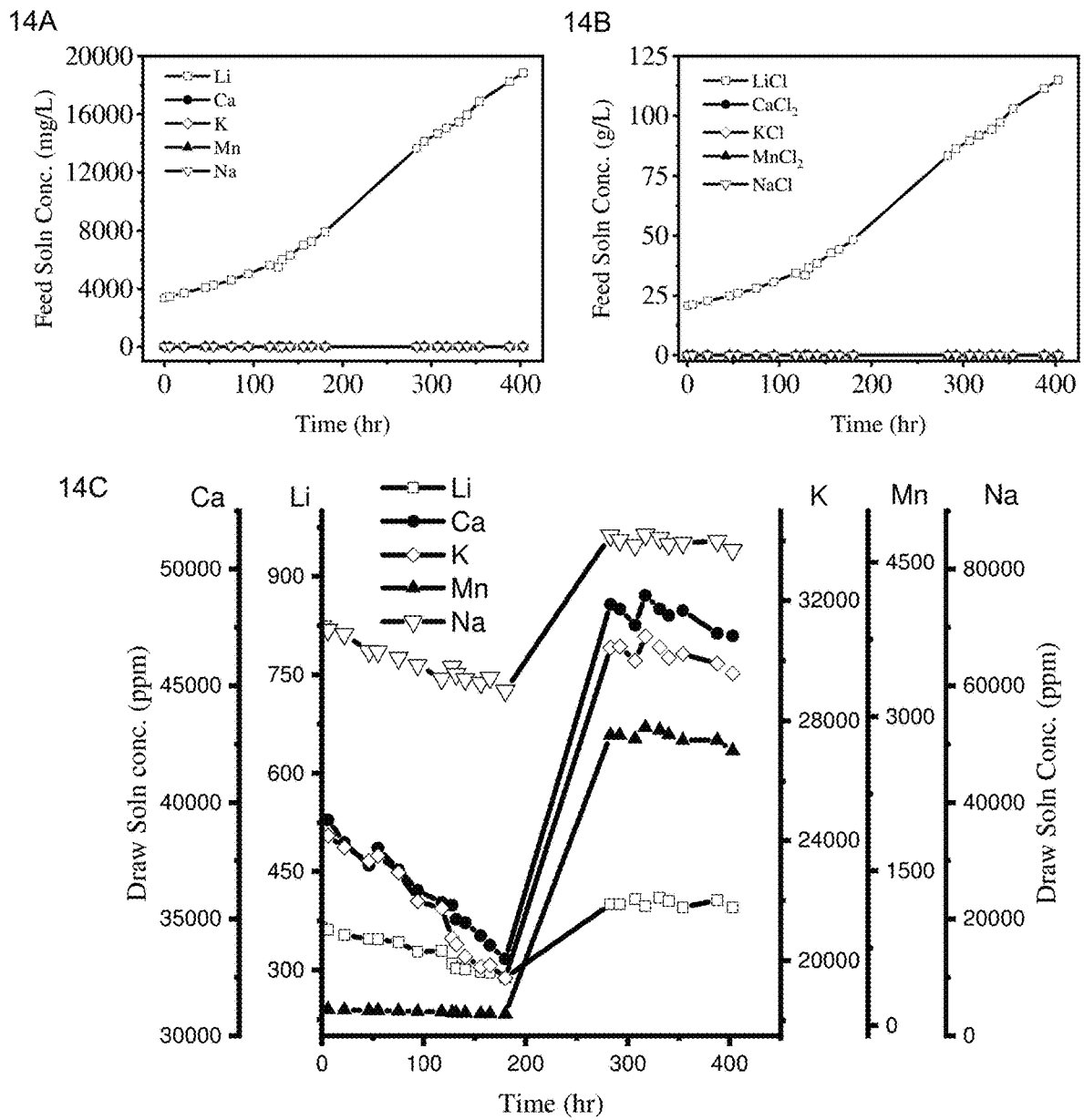
FIGS. 14A-14C are results of concentration experiments at an operating temperature of 50° C. using a hollow fiber membrane module coated with two layers of Kynar®-PVDF cured at 95° C. (module 3).

In order to investigate the effect of number of coating layers and treatment with pore wetting agent before the coating, another membrane module (Module 3) was fabricated. During the fabrication of this module, the fiber supports were soaked in Fluorinert FC-40 wetting agent to fill up the pores and prevent the Kynar®/PVDF coating from penetrating the pores which can cause an increase in membrane thickness and a reduction in water permeability. The wetting agent was removed during the curing step of the membrane. After soaking the fibers in the wetting agent, excess wetting agent was removed by gently wiping the surface of the fibers gently. Two coating layers were used keeping the same concentration of Kynar®/PVDF coating and XL-702 binder. FIGS. 14A-14C are results of concentration experiments at an operating temperature of 50° C. using a hollow fiber membrane module coated with two layers of Kynar®-PVDF cured at 95° C. (module 3). FIG. 14A shows results for the feed solution cation concentration. FIG. 14B shows results for the feed solution salt concentration. FIG. 14C shows results for the draw solution cation concentration.

The feed solution was the simulated sorbent column strip/eluent with an initial Li concentration of about 3382.5 mg/L (20.66 g/L, LiCl) as shown in FIG. 14A. Freshly prepared simulated brine was used as the draw solution as presented in FIG. 14C. The performance of Module 3 was evaluated for LiCl concentration at a constant temperature of 50° C. for a cumulative time of more than 400 hours. The metal ion concentration profiles in the LiCl and brine solutions obtained from Module 3 are presented in FIGS. 14A-14C. The LiCl concentration increased with time. At 50° C., the LiCl concentration increased about 3.5 times of its initial concentration. The water flux obtained at 50° C. with a lower curing temperature was 183 mL/m$^2$/h. No permeation of any cations permeated from the brine solution into the feed LiCl solution. Concentrations of cations in draw solution decreased over time as shown in FIG. 14C. However, the cation concentrations at the draw solution increased at 263 hours due to the use of a new brine solution. This study demonstrated that the membrane is stable and maintained its integrity for a total cumulative time of more than 400 hours.

CONCLUSION

A dilute LiCl solution obtained by a selective extraction of lithium from naturally occurring geothermal brine was concentrated using a novel forward osmosis PVDF composite membrane. The dilute LiCl solution was concentrated from 20 g/L to 115 g/L with a water transfer rate of 183 mL/m$^2$/h at an operating temperature of 50° C. The purity of the concentrated LiCl solution was greater than 99.99 wt. % and the membrane showed a stable performance for more than 400 hours. This study demonstrates that forward osmosis-based concentration of lithium chloride using PVDF composite membrane is a time and energy efficient and environmentally process which can also be applied to concentrate other lithium-containing solutions, such as lithium carbonate.

While there have been shown and described what are at present considered the preferred embodiments of the invention, those skilled in the art may make various changes and modifications which remain within the scope of the invention defined by the appended claims.

What is claimed is:

1. A method of concentrating a lithium-containing aqueous solution, the method comprising:
providing a water-permeable fluoropolymer structure consisting of a fluoropolymer and having an inner surface and outer surface, wherein at least said outer surface is bonded to a water-permeable hydrophilic layer of polyvinylidene fluoride (PVDF) in a crystalline beta phase, wherein the layer of PVDF contains a crosslinking agent crosslinked with the PVDF, wherein the crosslinked PVDF in crystalline beta phase is produced by depositing PVDF in the presence of said crosslinking agent onto said water-permeable fluoropolymer structure, and curing the PVDF in the presence of said crosslinking agent at a temperature of about 95° C.; and
flowing a lithium-containing aqueous feed solution having an initial concentration of lithium over said inner surface while said outer surface is in contact with an aqueous draw solution containing a higher overall ion concentration than said lithium-containing aqueous feed solution, to result in forward osmosis of water from said lithium-containing aqueous feed solution to said aqueous draw solution, and wherein said forward osmosis results in a lithium-containing aqueous product solution having an increased concentration of lithium relative to the initial concentration of lithium in the lithium-containing aqueous feed solution.

2. The method of claim 1, wherein said water-permeable hydrophilic layer is a hydrophilized version of polyvinylidene fluoride (PVDF).

3. The method of claim 1, wherein said water-permeable hydrophilic layer is bonded to only the outer surface.

4. The method of claim 1, wherein said hydrophilic polymer is coated on both the inner and outer surfaces.

5. The method of claim 1, wherein said lithium-containing aqueous feed solution is provided by a selective lithium extraction process, and the lithium-containing aqueous feed solution contains lithium in a predominant amount relative to other metal species.

6. The method of claim 5, wherein said lithium-containing aqueous feed solution as provided by said selective lithium extraction process has an initial concentration of lithium of up to 20 g/L.

7. The method of claim 1, wherein said lithium-containing aqueous product solution has a concentration of lithium of at least 50 g/L.

8. The method of claim 1, wherein said lithium-containing aqueous product solution has a concentration of lithium of at least 100 g/L.

9. The method of claim 1, wherein said aqueous draw solution has an overall ion concentration of at least 200 g/L with an osmotic pressure of more than 200 bar.

10. The method of claim 9, wherein said aqueous draw solution is a naturally occurring geothermal brine solution.

11. The method of claim 10, wherein said geothermal brine solution is a spent geothermal brine solution that is depleted in lithium.

12. The method of claim 1, wherein said increased concentration of lithium in the lithium-containing aqueous product solution is at least 100% greater in concentration than the initial concentration of lithium in the lithium-containing aqueous feed solution.

13. The method of claim 1, wherein said water-permeable fluoropolymer structure has a tubular shape.

14. The method of claim 1, wherein said water-permeable fluoropolymer structure is microporous or mesoporous.

15. The method of claim 1, wherein the method is conducted at a temperature of 25-100° C.

16. The method of claim 1, wherein the method excludes a reverse osmosis process.

17. The method of claim 1, wherein the lithium-containing aqueous product solution contains the lithium in at least 99 wt. % purity.

18. The method of claim 1, wherein the water-permeable fluoropolymer structure prevents transfer of lithium from the lithium-containing aqueous feed solution into the draw solution and also prevent transfer of ionic species from the draw solution into the lithium-containing aqueous feed solution during the forward-osmosis process.

19. The method of claim 1, wherein said fluoropolymer is selected from polyvinylidene fluoride (PVDF), polytetrafluoroethylene (PTFE), perfluorocycloalkenes (PFCAs), and perfluoroalkoxy alkanes (PFAs).

20. The method of claim 1, wherein the coating of the water-permeable hydrophilic polymer has a thickness of no more than 10 microns.

21. A method of concentrating a lithium-containing aqueous solution, the method comprising:
providing a water-permeable fluoropolymer structure consisting of a fluoropolymer and having an inner surface and outer surface, wherein at least said outer surface is bonded to a water-permeable hydrophilic polyvinylidene fluoride (PVDF) layer which contains a crosslinking agent crosslinked with the PVDF; and flowing a lithium-containing aqueous feed solution having an initial concentration of lithium over said inner surface while said outer surface is in contact with an aqueous draw solution containing a higher overall ion concentration than said lithium-containing aqueous feed solution, to result in forward osmosis of water from said lithium-containing aqueous feed solution to said aqueous draw solution, and wherein said forward osmosis results in a lithium-containing aqueous product solution having an increased concentration of lithium relative to the initial concentration of lithium in the lithium-containing aqueous feed solution.

\* \* \* \* \*